US006761868B2

(12) United States Patent
Brooks et al.

(10) Patent No.: US 6,761,868 B2
(45) Date of Patent: Jul. 13, 2004

(54) PROCESS FOR QUANTITATIVELY CONVERTING UREA TO AMMONIA ON DEMAND

(75) Inventors: Burton Brooks, Bellevue, WA (US); Walter A. Jessup, Seattle, WA (US); Brian W. MacArthur, Redmond, WA (US); W. Brad Sheats, Federal Way, WA (US)

(73) Assignee: The Chemithon Corporation, Seattle, WA (US)

(*) Notice: Subject to any disclaimer, the term of this patent is extended or adjusted under 35 U.S.C. 154(b) by 68 days.

(21) Appl. No.: 09/951,287

(22) Filed: Sep. 12, 2001

(65) Prior Publication Data

US 2003/0031604 A1 Feb. 13, 2003

Related U.S. Application Data

(60) Provisional application No. 60/291,661, filed on May 16, 2001.

(51) Int. Cl.[7] .................................................. C01C 1/08
(52) U.S. Cl. ..................................... 423/358; 423/235
(58) Field of Search ................................. 423/358, 235

(56) References Cited

U.S. PATENT DOCUMENTS

| 3,826,815 A | 7/1974 | Mavrovic ................... 423/356 |
| 3,900,554 A | 8/1975 | Lyon .......................... 423/235 |
| 3,922,222 A | 11/1975 | Van Moorsel ............... 210/71 |

(List continued on next page.)

FOREIGN PATENT DOCUMENTS

| DE | 0154 442 | 3/1982 |
| DE | 342 21 75 | 12/1985 |
| DE | 195 10 804 | 9/1996 |
| DE | 195 81 575 T1 | 4/1997 |
| DE | 198 34 980 | 12/1999 |
| EP | 0 326 943 | 8/1989 |
| EP | 0 342 184 | 11/1989 |
| EP | 0 487 886 | 6/1992 |
| EP | 0 582 022 A1 | 2/1994 |
| EP | 0 848 985 | 6/1998 |
| EP | 0 738 179 B1 | 4/1999 |

(List continued on next page.)

OTHER PUBLICATIONS

Kucheryavyi et al.; "Kinetics of the Hydrolysis of Urea at High Temperatures in Relation to Purification of Waste Waters in Urea Manufacture"; translated from *Zhurnal Prikladnoi Khimii*, vol. 42, No. 7, pp. 1596–1600 (1969), (no month).

Blasiak et al.; "Equilibrium Pressure in the System $NH_4CO_2NH_2 + H_2O$ at High Temperatures"; *Chemia Stosowana*, vol. 4, No. 545, pp. 545–550 (1983), (no month).

Makansi, Jason Ed.; "Ammonia: It's coming to a plant near you"; *Power* pp. 20–22 (May, 1992), (no month).

Smith et al.; "Integrated Dry $NO_x/SO_x$ Emissions Control System Low–$NO_x$ Combustion System SNCR Test Report," Public Service Company of Colorado, DOE Contract No. DE–FC22–91 PC 90550 (Jun. 1994).

(List continued on next page.)

Primary Examiner—Wayne A. Langel
(74) Attorney, Agent, or Firm—Marshall, Gerstein & Borun LLP

(57) ABSTRACT

Processes and apparatus for quantitatively converting urea to ammonia on demand are disclosed. One process includes the steps of: receiving a demand rate signal for ammonia; feeding reactants including urea and water into a reactor to provide a reaction mixture; and controlling temperature and pressure in the reactor to produce a gaseous product stream including ammonia and carbon dioxide at substantially constant concentrations. Another process includes the steps of: feeding molten urea or solid urea to a reactor; feeding water (liquid or steam) to the reactor; and reacting the urea and water at elevated temperature and pressure to form a gaseous product stream including ammonia and carbon dioxide.

68 Claims, 17 Drawing Sheets

U.S. PATENT DOCUMENTS

| | | | |
|---|---|---|---|
| 4,087,513 A | 5/1978 | Schell | 423/437 |
| 4,168,299 A | 9/1979 | Schell | 423/358 |
| 4,208,386 A | 6/1980 | Arand et al. | 423/235 |
| 4,220,632 A | 9/1980 | Pence et al. | 423/239 |
| 4,220,635 A | 9/1980 | Schell | 423/358 |
| 4,231,960 A | 11/1980 | Schmidt | 564/73 |
| 4,308,385 A | 12/1981 | Goorden | 544/201 |
| 4,314,077 A | 2/1982 | Zardi et al. | 564/70 |
| 4,325,924 A | 4/1982 | Arand et al. | 423/235 |
| 4,341,640 A | 7/1982 | Landis | 210/752 |
| 4,410,503 A | 10/1983 | van Nassau et al. | 423/359 |
| 4,456,535 A | 6/1984 | Zuidam et al. | 210/750 |
| 4,533,364 A | 8/1985 | Altman et al. | 55/5 |
| 4,552,979 A | 11/1985 | Stokes | 564/69 |
| 4,652,678 A | 3/1987 | Douwes | 564/73 |
| 4,731,233 A | 3/1988 | Thompson et al. | 423/231 |
| 5,034,030 A | 7/1991 | Miller et al. | 55/96 |
| 5,058,514 A | 10/1991 | Mozes et al. | 110/345 |
| 5,096,599 A | 3/1992 | Granelli | 210/750 |
| 5,098,680 A | 3/1992 | Fellows et al. | 423/235 |
| 5,223,238 A | 6/1993 | Czuppon | 423/359 |
| 5,240,688 A | 8/1993 | von Harpe et al. | 423/235 |
| 5,252,308 A | 10/1993 | Young | 423/235 |
| 5,262,138 A | 11/1993 | Young | 423/235 |
| 5,281,403 A | 1/1994 | Jones | 423/235 |
| 5,281,403 A | 1/1994 | Jones | 423/235 |
| 5,399,755 A | 3/1995 | Lagana' | 564/63 |
| 5,489,420 A | 2/1996 | Diep | 423/235 |
| 5,543,123 A | 8/1996 | Hofmann et al. | 423/235 |
| 5,567,226 A | 10/1996 | Lookman et al. | 95/3 |
| 5,827,490 A | 10/1998 | Jones | 423/239.1 |
| 5,974,789 A | 11/1999 | Mathes et al. | 60/274 |
| 5,985,222 A | 11/1999 | Sudduth et al. | 423/235 |
| 5,985,224 A | 11/1999 | Lagana | 423/235 |
| 6,077,491 A | 6/2000 | Cooper et al. | 423/235 |
| 6,093,380 A | 7/2000 | Lagana et al. | 423/239.1 |
| 6,110,435 A | 8/2000 | Lehner et al. | 423/235 |
| 6,120,580 A | 9/2000 | Sandler | 95/11 |
| 6,146,605 A | 11/2000 | Spokoyny | 423/239.1 |
| 6,322,762 B1 | 11/2001 | Cooper et al. | 423/235 |
| 6,436,359 B1 * | 8/2002 | Spencer, III et al. | 423/358 |
| 6,471,927 B2 * | 10/2002 | Hofmann et al. | 423/358 |
| 6,511,644 B1 * | 1/2003 | MacArthur et al. | 423/358 |
| 2001/0016183 A1 | 8/2001 | Hofmann et al. | |

FOREIGN PATENT DOCUMENTS

| | | |
|---|---|---|
| EP | 1 019 321 A1 | 7/2000 |
| GB | 896660 | 5/1962 |
| GB | 1103041 | 2/1968 |
| JP | 53-52274 | 5/1978 |
| JP | 57-188560 | 11/1982 |
| JP | 59-82987 | 5/1984 |
| JP | 63-198713 | 8/1988 |
| JP | 63-244785 | 9/1988 |
| JP | 02-191528 | 7/1990 |
| JP | 02-268811 | 11/1990 |
| JP | 08-57258 | 3/1996 |
| JP | 08-57261 | 3/1996 |
| JP | 08-71372 | 3/1996 |
| JP | 08-215536 | 8/1996 |
| JP | 09-294913 | 11/1997 |
| JP | 11-171535 | 6/1999 |
| NL | 8105027 | 6/1983 |
| SU | 239863 | 8/1969 |
| WO | WO 92/02291 | 2/1992 |
| WO | WO 94/13391 | 6/1994 |
| WO | WO 95/09810 | 4/1995 |
| WO | WO 96/06674 | 3/1996 |
| WO | WO 96/27428 | 9/1996 |
| WO | WO 97/07876 | 3/1997 |
| WO | WO 98/42623 | 10/1998 |
| WO | WO 99/61136 | 12/1999 |
| WO | WO 00/07695 | 12/2000 |

OTHER PUBLICATIONS

International Preliminary Examination Report (PCT) Application No. PCT/US98/05708 dated May 11, 1999, believed to be publicly available Oct., 1999.

Hunt et al.; "Selective Non–Catalytic Operating Experience Using Both Urea and Ammonia" 1993 Joint Symposium on Stationary Combustion $NO_x$, *Control* (May 1993).

Dr.–Ing. Ulrich Neurmann; "Drei trockene Typen Das DENOX–Verfahren von Hitachi";(Three Dry Types—The $DeNO_x$ Process from Hitachi), *Energie* (Apr., 1986).

International Search Report for PCT/US02/09294 mailed Aug. 7, 2002.

* cited by examiner

PROCESS FOR QUANTITATIVELY CONVERTING UREA TO AMMONIA ON DEMAND

CROSS REFERENCE TO RELATED APPLICATION

The benefit under 35 U.S.C. §119 (e) is claimed based on provisional application Serial No. 60/291,661, filed May 16, 2001, the entire disclosure of which is hereby incorporated by reference.

BACKGROUND OF THE INVENTION

1. Field of the Invention

The invention relates generally to methods of converting urea to ammonia. In particular, the invention relates to quantitative conversion of urea to ammonia in response to a demand for ammonia. More specifically, the invention relates to quantitatively converting urea to ammonia at a rate closely following the instant demand rate for ammonia, for example in a system for quantitative chemical treatment applications, such as removal of oxides of nitrogen from or conditioning fly ash present in fuel combustion tailgas streams.

2. Brief Description of Related Technology

Ammonia has long been known to be useful in the treatment of stack gases (also referred to herein as flue gases or tail gases) from fossil fuel combustion processes, for example, coal-fired electric power generating plants. The boiler effluent gas stream from such a process contains oxides of nitrogen ($NO_x$) that are well known air pollutants, contributing to photochemical smog and causing other deleterious consequences to the environment. Under the right conditions, ammonia will react with $NO_x$, converting the nitrogen oxides to nitrogen and water. The most familiar methods for $NO_x$ destruction using ammonia are known as Selective Catalytic Reduction (SCR) and Selective Non-Catalytic Reduction (SNCR). Of these, the SCR methods achieve the highest removal efficiency. The boiler flue gases from electric generating plants also contain fly ash, which is often collected by means of electrostatic precipitators. Ammonia conditioning (controlled injection into the flue gas stream) is often beneficial in such systems to improve fly ash collection efficiency and improve performance. In both of these applications, the treatment process requires precise quantitative delivery of ammonia at a rate that follows a variable demand.

Ammonia may be obtained as an anhydrous liquid or as an aqueous solution, but in either case the safety issues are quite severe. The daily quantities of ammonia required to support a large industrial application may be very substantial, necessitating large capacity storage facilities at the site. Ammonia is a dangerous chemical with a noxious odor, it is very toxic to most life forms, highly volatile, and is also potentially explosive. Numerous regulations apply to the safe transport, storage and handling of ammonia. Storage facilities require containment and deluge systems, continuous safety monitoring, periodic inspections, specialized training programs, and special operating permits. Ammonia is classified as a hazardous material, and storage of large quantities of such a chemical in many locations, for example, near urban population centers, is highly undesirable.

In contrast to ammonia, urea is an innocuous raw material, which may be hydrolyzed to form ammonia and carbon dioxide gases. Several urea hydrolysis processes have been described with the intent to generate a gaseous stream of ammonia, carbon dioxide, and water vapor at a temperature and pressure useful for removal of nitrogen oxides, treatment of fly ash or for other compatible process applications.

Young U.S. Pat. No. 5,252,308 (Oct. 12, 1993), the disclosure of which is incorporated herein by reference, describes two variations of a process that performs urea hydrolysis in the presence of an acid. The Young patent discloses the use of certain protic mineral acids (e.g., hydrochloric acid) and polyprotic mineral acids, such as phosphoric or sulfuric acid, and monoammonium dihydrogen phosphate (also referred to herein as MAP). The Young patent teaches that the chemical reaction mechanism employs the acid and its monoammonium salt as intermediates, and that the reaction results in a quantitative production of ammonia from urea. The Young patent does not disclose how to control the apparatus to quantitatively produce a gaseous ammonia stream at a variable rate suitable for quantitative chemical treatment applications, such as removal of oxides of nitrogen from or conditioning fly ash present in fuel combustion tailgas streams.

Lagana U.S. Pat. No. 5,985,224 (Nov. 16, 1999), the disclosure of which is incorporated herein by reference, describes an apparatus that hydrolyzes an aqueous urea feed (from dissolved solid urea) in a heated and pressurized reactor vessel, and that uses steam to strip the ammonia and carbon dioxide product gases. The inlet urea solution flows through a series of divided chambers in the reactor, becoming gradually more dilute, and emerges from the reactor for recycle back to the urea dissolving portion of the system. The Lagana patent does not disclose the use of any compounds to enhance the rate of reaction, but does disclose steam stripping. The process according to the Lagana patent requires a large energy input for steam to heat the reactor contents and strip the product gases from solution. The Lagana patent does not disclose how to control the apparatus to quantitatively produce an ammonia stream at a variable rate suitable for quantitative chemical treatment applications, such as removal of oxides of nitrogen from or conditioning fly ash present in fuel combustion tailgas streams.

Cooper et al. U.S. Pat. No. 6,077,491 (Jun. 20, 2000), the disclosure of which is incorporated herein by reference, describes a process and apparatus for producing a gaseous ammonia stream from aqueous solutions of urea and/or biuret. In the methods disclosed and claimed in the Cooper et al. patent, the product gas flow rate is regulated in response to the demand for ammonia by the external process. Withdrawing gas from the reactor in this manner causes corresponding variation in the reactor pressure and temperature, which would necessarily change the rate of reaction. For example, when gas is released at an increased rate in response to an increase in demand, the pressure inside the reactor will drop, causing more water to flash to the vapor phase, which will lower the temperature of the reactants and slow the rate of urea conversion to ammonia. In addition, the concentration of ammonia in the product gas stream will drop in relation to the steady-state concentration that existed just prior to the change (e.g., increase) in demand and concomitant release of product gas. The disclosed control scheme compensates by varying the heat input to the reactor to raise the temperature (increasing the rate of reaction) which, in turn, will eventually restore the pressure. As the liquid level in the reactor begins to fall, a level control loop increases the flow of aqueous urea fed to the reactor to restore a balance at the higher production rate.

By controlling the process in this manner, the rate of reaction and concentration of ammonia in the product gases (and, thus, the amount of ammonia delivered to the external use) are variable, even though the product stream mass flow rate is matched to the external demand for ammonia. The process must reach a full steady state before the ammonia production matches the demand. Large and sudden changes in ammonia demand will cause a significant upset in the process, and can require additional control means, such as a quench-cooling system to effect a rapid reduction in production. Restoration of a sudden large demand following such a quench-cooling event would require reheating the entire reactor and its contents, which requires a significant amount of time.

To successfully employ urea hydrolysis for quantitatively generating ammonia for use in applications for removal of $NO_x$ from stack gas streams using selective catalytic reduction (SCR) or selective non-catalytic reduction (SNCR) process technology (referred to herein as a $deNO_x$ system or a $deNO_x$ application), the rate of ammonia produced and discharged by the urea hydrolysis process must closely follow an ammonia demand signal. The ammonia demand rate signal can be a function of a boiler load, a measured ammonia slip (defined below), the efficiency of the reaction of ammonia with nitrous oxides, a combination of such measurements, or any other suitable measurement. The ammonia demand rate is the instantaneous requirement from the ammonia-consuming application that provides a moving target that a urea hydrolysis system attempts to satisfy.

Changes in the ammonia demand signal can be dramatic in real applications. For example, in an electric generating plant the boiler load alone can change as much as four times in magnitude (25% to 100% for example) over the course of a typical 24-hour operating day. A urea hydrolysis process must be able to quickly adjust to large changes in ammonia demand, and the quicker the response time, the better the urea hydrolysis process. It is also important to consider the effect of a sudden increase in demand as compared to a sudden decrease in demand. With a sudden increase in demand, the ammonia generation system (urea hydrolysis system) will be increasing the ammonia production, and therefore any lag results in a temporary under-feeding to the $deNO_x$ system. The consequence is a temporary increase in $NO_x$ concentration in the stack gases (assuming ammonia is properly distributed, etc.). With a sudden decrease in demand, a more serious situation can result. In this case, as the ammonia generator (urea hydrolyzer) reduces the ammonia production to the new, lower, requirement, a transitory over-feeding of ammonia can occur. If excess ammonia is supplied (assuming good distribution), then some residual ammonia can pass through the $deNO_x$ system unreacted and go up the stack to the atmosphere. The presence of unreacted ammonia vapor in the stack discharge is referred to as "ammonia slip," and it is a performance measure that has governmental regulatory significance, since ammonia is a poisonous and obnoxious-smelling gas. Typical performance guarantees on $deNO_x$ process systems are in the range 1 ppm to 3 ppm of ammonia slip.

In a commercial scale $deNO_x$ system the rate of ammonia consumption is quite large. Therefore, it would be very costly (impractical) to provide a large "surge tank" (or pressurized storage reservoir) for ammonia and carbon dioxide gases and water vapor produced in a urea hydrolysis reaction, which gases would also have to be maintained at a temperature above 60° C. to avoid formation of ammonium carbonate, and from which a flow of these gases could be withdrawn to meet the instant demand. Instead, it would be desirable to provide a urea hydrolysis process and apparatus that enables a simple fast-acting control to produce ammonia in a reactor at a rate equivalent to the instantaneous demand of an ammonia-consuming process, for example.

Accordingly, it would be desirable to have an energy-efficient process and apparatus for converting urea to ammonia and producing an ammonia-containing product stream at a rate that can be quickly changed in response to a demand for quantitative chemical treatment applications.

SUMMARY OF THE INVENTION

It is an objective of the invention to overcome one or more of the problems described above.

Accordingly, one aspect of the invention is a process for quantitatively converting urea to ammonia on demand including the steps of: receiving a demand rate signal for ammonia; feeding reactants including urea and water into a reactor to provide a reaction mixture; and controlling temperature and pressure in the reactor to produce a gaseous product stream including ammonia and carbon dioxide at substantially constant concentrations.

Another aspect of the invention provides a process for quantitatively converting urea to ammonia on demand, including the steps of: feeding reactants including molten or solid urea and water into a reactor; and reacting the reactants at elevated temperature and pressure to form a gaseous product stream including ammonia and carbon dioxide.

Yet another aspect of the invention provides an apparatus for quantitatively converting urea to ammonia on demand including: a reactor vessel adapted to contain reactants including urea and water at elevated temperature and pressure and to release a gaseous product stream including ammonia, carbon dioxide, and water; a feeder for feeding molten urea into the vessel (or a feeder for feeding solid urea into the vessel); a heater for heating the reactants to elevated temperature; and a variable restriction device in fluid communication with the reactor for maintaining the reactants at elevated pressure and releasing the gaseous product stream.

Still another aspect of the invention provides an apparatus for quantitatively converting urea to ammonia on demand including: an ammonia demand rate signal receiver; a reactor vessel adapted to contain reactants including urea and water at elevated temperature and pressure and to release a gaseous product stream including ammonia, carbon dioxide, and water; a feeder for feeding urea into the vessel; a heater for heating the reactants to elevated temperature; and a variable restriction device in fluid communication with the reactor for maintaining the reactants at elevated pressure and releasing the gaseous product stream.

Further aspects and advantages of the invention may become apparent to those skilled in the art from a review of the following detailed description, taken in conjunction with the appended claims. While the invention is susceptible of embodiments in various forms, described hereinafter are specific embodiments of the invention with the understanding that the disclosure is illustrative, and is not intended to limit the invention to the specific embodiments described herein.

DETAILED DESCRIPTION OF THE INVENTION

Figure 1:
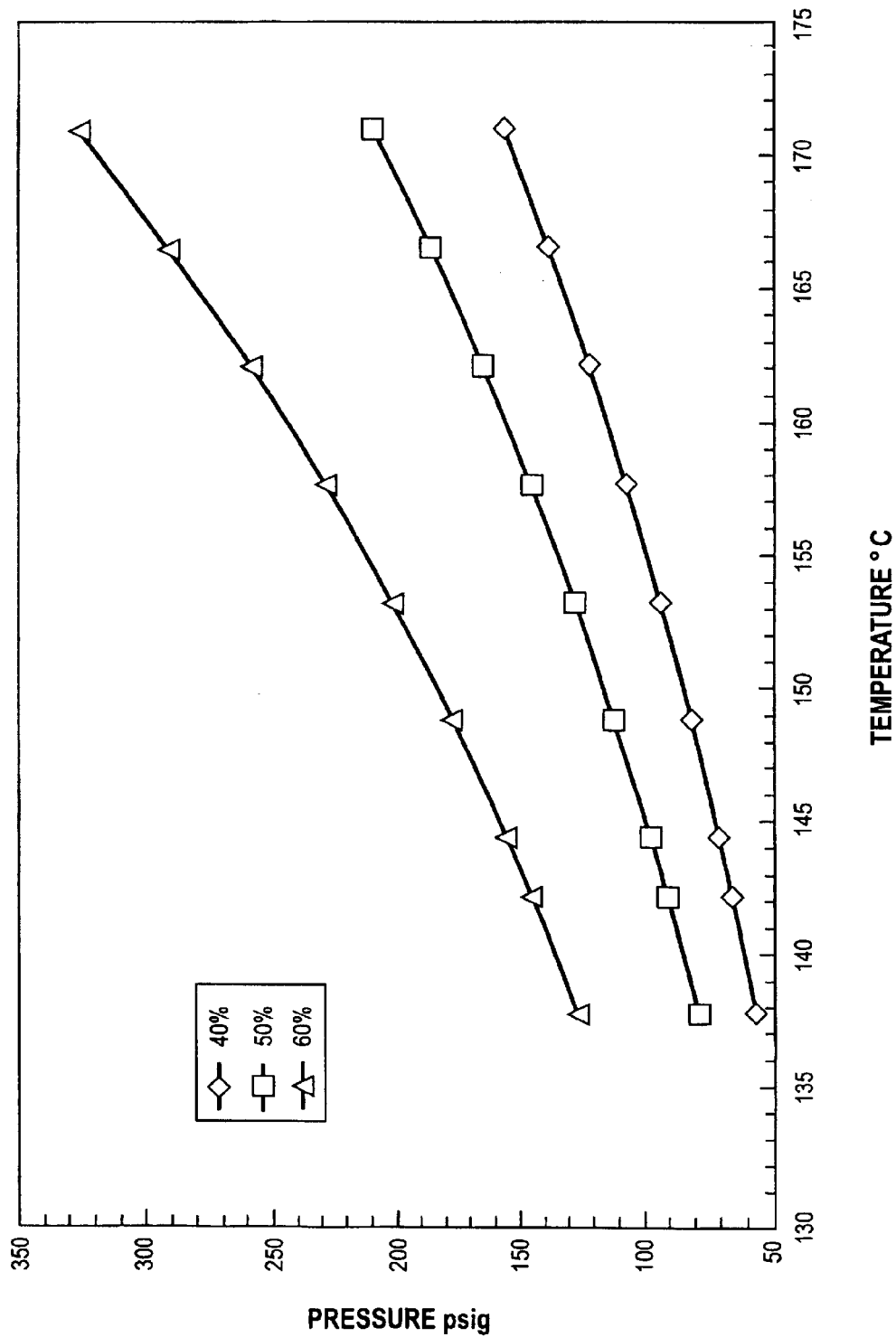
FIG. 1 depicts theoretical equilibrium lines relating steady state operating pressure and operating temperature for non-catalyzed hydrolysis of 40 wt. %, 50 wt. %, and 60 wt.% urea solutions.

The invention is directed to processes and apparatus for quantitatively converting urea to ammonia, optionally with the use of a catalyst.

As recited herein, the term "substantially" is used to modify the term "constant," recognizing that there can be small fluctuations in real-world, practical control processes and apparatus. Thus, for example, maintaining the temperature in a reactor "substantially constant" means that temperature is controlled to a constant set point. As another example, a process step of maintaining temperature in a reactor "substantially constant" also encompasses a process of continuously or intermittently changing a temperature set point, so long as the actual (i.e., measured) temperature varies no more than if the temperature set point were held constant. Similarly, while a constant concentration of aqueous urea can be fed to a reactor (by virtue of having dissolved a quantity of urea in a quantity of water), the feed rate will only be as constant as the pump will allow.

As recited herein, the term "steady state" is used to refer to a process wherein all control variables are set to constant values (e.g., constant reactants feed, constant energy (e.g., heat) input, substantially constant reactor temperature and pressure). The term "equilibrium" is used to refer to state or condition of balance; thus, when the rate of evaporation of a liquid into the vapor phase and the rate of condensation of the vapor back into the liquid phase are equal, the amount of pressure is referred to as the equilibrium vapor pressure. Often, a reactor as described herein can be operated at steady state, but will not necessarily be at equilibrium. For example, after a change from one steady state set of conditions to a second steady state set of conditions (e.g., doubling rate of reactants feed and heat input, maintaining substantially constant temperature and pressure), the system will go through a change before it reaches equilibrium again (e.g., gradual increase in gas flow out).

In non-catalyzed and catalyzed processes according to the invention, certain fundamental reaction mechanisms, reaction kinetics, and vapor-liquid equilibria are at work during the conversion of urea to ammonia, and are described below.

Reaction Mechanisms

The net reaction in a urea hydrolysis process is described in equation 1, below.

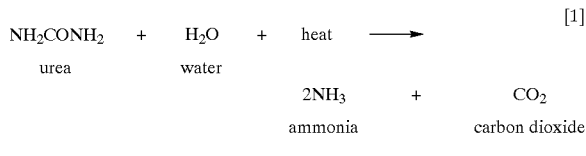

Equation 1 expresses the overall observed effect. Urea combines with water, consuming necessary heat to drive the overall endothermic reaction, and produces ammonia and carbon dioxide gases. The reaction proceeds readily at a temperature of at least 145° C. and occurs over a wide range of pressure from atmospheric to several hundred psig.

The Non-Catalyzed Reaction

In several studies (e.g., E. A. Werner, "The Constitution of Carbamides," Journal of the Chemical Society Transactions (London), vol. 113, p. 84–99 (1918) and George Tsei-Yu Chao, *Ureas, Its Properties and Manufacture*, Taipei, Taiwan, p. 97–118 (1967)) examining the non-catalyzed hydrolysis of urea at temperatures of at least 145° C., the conversion of urea to ammonia and carbon dioxide proceeds according to equations 2 through 4, below.

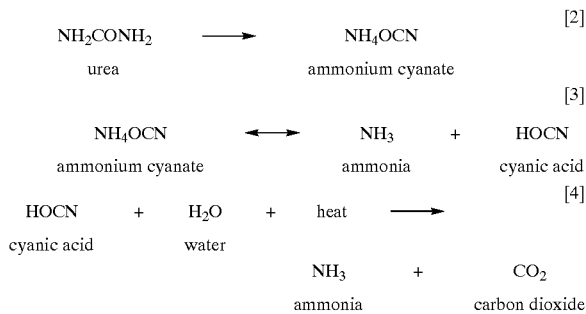

The reactions in equations 2 and 3 are relatively fast, whereas the reaction in equation 4 is relatively slower. As shown in equations 2 and 3, the urea molecule first rearranges itself into ammonium cyanate, which then rapidly decomposes at elevated temperature to yield one molecule of ammonia and one molecule of cyanic acid. The reaction in equation 3 is an equilibrium reaction as long as ammonia remains in solution. However, at elevated temperature the reaction conditions shift the equilibrium to formation of cyanic acid, since the ammonia readily desorbs from the solution to the gas phase, leaving the cyanic acid behind. As shown in equation 4, the cyanic acid requires energy (endothermic step) to combine with a water molecule to release a second molecule of ammonia and carbon dioxide.

Catalyzed Reaction

It is known that certain acids and strong bases can promote the urea hydrolysis reaction (see Chao, *Urea, Its Properties and Manufacture*, Taipei, Taiwan, p. 97–118 (1967)), resulting in significantly faster rates of reaction. For example, addition of sodium hydroxide (strong base) increases the rate of hydrolysis, but results in formation of sodium carbonate as a by-product. Thus, sodium hydroxide must be continually added as a reactant and sodium carbonate must be removed as a by-product to sustain the process, both of which present significant disadvantages in process complexity and operation costs, for example.

Young U.S. Pat. No. 5,252,308 teaches that using an acid catalyst at elevated temperature results in the formation of an ammonium salt of the acid that is subsequently thermally decomposed to yield ammonia and the acid. Thus, in the general case, the reaction proceeds according to equations 5 and 6, below.

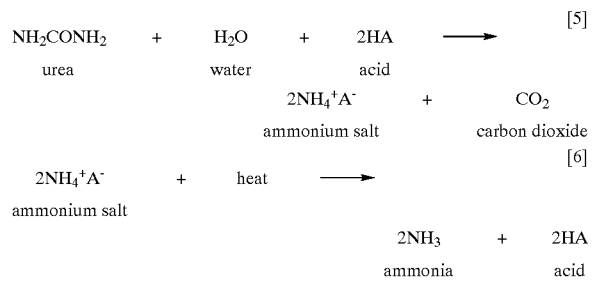

The Young patent discloses that when the acid is phosphoric acid, the reaction proceeds according to equations 7 and 8, below.

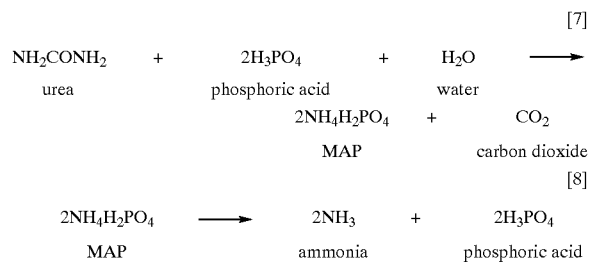

Accordingly, the Young patent teaches that the reaction vessels must be made from a material that can withstand hot (greater than 145° C.), concentrated phosphoric acid.

It has been discovered that introducing a polyprotic acid, specifically the polyprotic mineral acid phosphoric acid, into an aqueous urea solution at elevated temperature and pressure results in the deprotonation of phosphoric acid to first form the monoammonium salt and then the diammonium salt, the diammonium salt subsequently being thermally decomposed to yield ammonia and the monoammonium salt. Thus, for example, when phosphoric acid is used, after initial formation of MAP, diammonium hydrogen phosphate (referred to herein as DAP) is formed and then DAP is thermally decomposed according to the reactions shown in equations 9 and 10, below.

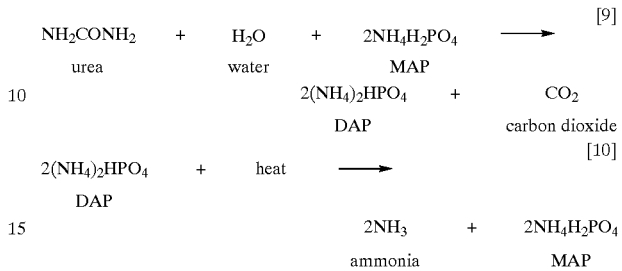

In this process, the MAP is acting as a Lewis acid in the reaction mechanism.

Thus, MAP reacts with urea to form DAP and gaseous carbon dioxide in the reaction shown in equation 9 and then, with supply of sufficient heat, the DAP releases gaseous ammonia according to equation 10, reforming MAP. At steady state production, controlling to constant temperature and pressure in a reactor, the combination of these two reactions requires the input of energy (heat) in proportion to the total production of ammonia plus the amount of any water evaporated from the reaction mixture. At equilibrium, the composition of the liquid reaction mixture will become substantially constant, and will include a certain fraction of MAP and DAP, unreacted urea, and water, with a small contribution from dissolved ammonia and carbon dioxide. A reaction mixture including urea, water, MAP, DAP, and dissolved gases has a pH that will vary depending on the temperature and pressure maintained in the reactor, but is generally neutral in one preferred embodiment where the temperature is about 171° C. (about 340° F.) and about 120 psig.

Reaction Kinetics

The hydrolysis of urea to form ammonia and carbon dioxide behaves as a first order reaction in the range of concentration of practical interest (e.g., less than about 76 wt. % urea), wherein the reaction rate is directly proportional to the amount of reactants present. Whether considering an acid-catalyzed or non-catalyzed system, in the methods according to the invention both catalyst and water in the former instance and water in the latter will be present in a large molar excess with respect to urea. Thus, the reaction rate is effectively proportional to the amount of urea present in the reactor, as expressed in equation 11, below:

$$r = kx \qquad [11],$$

wherein r represents the rate of reaction, k represents the reaction rate constant, and x represents the amount of urea present in the reactor. The reaction rate represents the rate at which urea is consumed by the reaction, and its units depend on the choice of units for x (e.g., mass, moles, or a concentration such as mass/unit volume). If x is a concentration such as mass/unit volume, then the reaction rate represents the mass of urea reacting per minute per unit volume of reactor.

The reaction rate constant k is defined herein as the ratio of urea reacting per unit time (e.g., typically in minutes, thus k has units minutes$^{-1}$) to the total urea present in the reactor. Put another way, the reaction rate constant is the fraction of urea that is reacting per minute. The reaction rate constant in the reaction systems according to the invention is primarily a function of temperature, but other factors such as pressure, pH, reactants concentration, and particularly the presence of catalyst can also influence the reaction rate constant.

The reaction time is defined as the inverse of the reaction rate constant (e.g., 1/k) and has units of time (e.g., minutes). The reaction time is the average time a molecule of urea is in the reactor before conversion to ammonia when operating continuously at steady state conditions.

The value of the reaction rate constant at a particular set of conditions in a catalyzed system can be determined experimentally by a number of different methods. One of the simplest methods is to carry out the urea hydrolysis reaction at steady state with a constant feed rate of a constant concentration of reactants being fed to a reactor, operating at constant temperature and pressure, and performing a material balance around the reactor. When operating continuously at steady state, the amount of urea in the reactor is constant, so the rate of ammonia and carbon dioxide leaving the reactor is directly proportional to the rate of urea entering the reactor. When using a catalyst such as MAP (or mixture of MAP and DAP), the reaction rate is extremely fast and the urea concentration in the reactor is very small (e.g., typically 1 wt. % to 10 wt. %), which, upon a change in demand, allows the urea concentration to quickly equilibrate to a value proportional to the new urea feed rate. When this occurs, the urea feed rate is then equal to the hydrolysis rate, i.e., the reaction rate in equation 11. Knowing the reaction rate, the reaction rate constant can be calculated by equation 11 if the mass (or concentration) of reactants is known. The mass of urea (or concentration) can be determined by first weighing the catalyst originally charged to the reactor, and then by sampling the reaction mixture during continuous operation and analyzing for urea and catalyst salts. It is then possible to calculate the mass of urea in the reactor by multiplying the mass of catalyst by the mass fraction of urea in the sample and dividing by the mass fraction of catalyst in the sample. Combining this with equation 11, the reaction rate constant can then be calculated by equation 12, below:

$$k = \frac{Q(f_c)}{m_c(f_u)} \quad [12]$$

wherein Q represents the mass flow rate of urea fed to the reactor, $m_c$ represents the mass of catalyst charged to the reactor, $f_c$ represents the measured mass fraction of catalyst, and $f_u$ represents the measured mass fraction of urea in the sample.

The reaction rate constant is a function of temperature but is independent of the urea feed rate. However, at equilibrium the reaction rate is equal to the urea feed rate, and is independent of temperature. When the temperature is changed, there is an inversely proportional change in the urea concentration, until the reaction rate returns to equilibrium with the urea feed rate, which happens quickly, because of the small quantity of urea in the reactor.

Reaction rate constants for non-catalyzed urea hydrolysis were determined experimentally by a different procedure. In comparison with catalyzed urea hydrolysis, the reaction rate in non-catalyzed urea hydrolysis is relatively slow. Therefore, to achieve similar ammonia production rates, the quantity of urea present in the non-catalyzed reactor is relatively large. Changing the heat input to the reactor and consequently changing the reaction temperature more conveniently regulates the reaction rate in this system. Unlike the catalyzed system, in this case the reaction rate at any time is not closely related to the urea feed rate (only at full equilibrium and steady state conditions). To determine the reaction rate constant, first the mass of urea initially charged to the reactor is accurately measured. The reaction rate constant is determined with greater accuracy by measuring the rate of gas flow leaving the reactor at a constant reactor pressure. Thus, if the concentration of ammonia in the exit gas mixture is accurately measured, then the reaction rate constant k can be determined.

The gas mixture leaving the reactor is composed of ammonia, carbon dioxide and water vapor. The percentage of ammonia and carbon dioxide are stoichiometrically related to the amount of urea reacting, and the percentage of water vapor is proportional to the ratio of water to urea in the feed when the reactor is operated at equilibrium and steady state conditions. When the reaction temperature is changed, the concentration of water in the reaction solution changes until a new equilibrium balance between the inlet and outlet water flow rates is established. The reactor volume must be relatively large for non-catalyzed urea hydrolysis processes, and therefore it can take a long period of time (e.g., about three hours for 95% of full equilibrium) for the water inlet and outlet flows to equilibrate, during which time the outlet gas flow rate by itself is not an accurate measurement proportional to the ammonia production rate, since the concentration of the ammonia (and other species) is changing. Based on measured reaction rate constants, the non-catalyzed hydrolysis process of the prior art required about seven hours to reach 80% of the equilibrium water concentration after a change in temperature.

Much-improved performance in non-catalyzed urea hydrolysis processes is possible by operating the reactor in a different manner, namely by keeping the water concentration in the reaction solution substantially constant as the process reacts to a change in temperature.

The water content in the reaction mixture depends on the reaction temperature, pressure, and ratio of water to urea in the feed. If the feed concentration remains constant and the temperature changes, then it is necessary to make a change in the system pressure in order to keep the water content of the reaction mixture substantially constant. The pressure can be determined by means of either a theoretical or experimental vapor-liquid equilibrium model, such as is illustrated in FIG. 1.

When the water content of the reaction mixture is kept substantially constant, then the urea hydrolysis rate (reaction rate) can be calculated by multiplying the fraction of water in the urea feed with the mass flow rate of the outlet gas. The rate constant is calculated by dividing the hydrolysis reaction rate by the mass of urea in the reactor according to equation 11.

The relationship between the temperature and the rate constant, known as the Arrhenius equation, can be expressed as in equation 13, below:

$$\ln\frac{k_2}{k_1} = \frac{E}{R}\left[\frac{1}{T_1} - \frac{1}{T_2}\right] \quad [13]$$

wherein:
$T_1$ and $T_2$ are steady state operating temperatures (° K);
$k_1$ is the reaction rate constant at temperature $T_1$;
$k_2$ is the reaction rate constant at temperature $T_2$;
E is the activation energy; and
R is the ideal gas law constant.

If the natural logarithm of k (ln(k)) is plotted against 1/T, a straight line should result with slope equal to −E/R. Thus, if the reaction rate constant is determined at two temperatures, the value of k and the energy of activation can be predicted at any temperature.

A series of steady-state catalyzed (MAP/DAP) experiments was conducted at a reactor pressure of 120 psig and various temperatures to determine the reaction rate constant k and the average reaction time 1/k. For comparison, experiments were also conducted without catalyst, varying temperature and pressure (using a vapor-liquid equilibrium model to select the pressure in response to the temperature) as described. The results of both series of experiments are presented in FIG. 2, in addition to extrapolated values for the un-catalyzed system at 167.2° C. and 171.1° C. (i.e., 1000/T (° K) of 2.29 and 2.25, respectively), for comparison. In the preferred temperature range, about 165° C. to about 170° C., the rate constants and reaction times for the MAP/DAP reaction are approximately fifteen times faster than the non-catalyzed process. FIG. 3 is a graph of the same data (measured and extrapolated) plotted as the natural logarithm of k versus the reciprocal of the absolute temperature. As predicted by the Arrhenius equation, the data are well correlated with a straight line.

Figure 4:
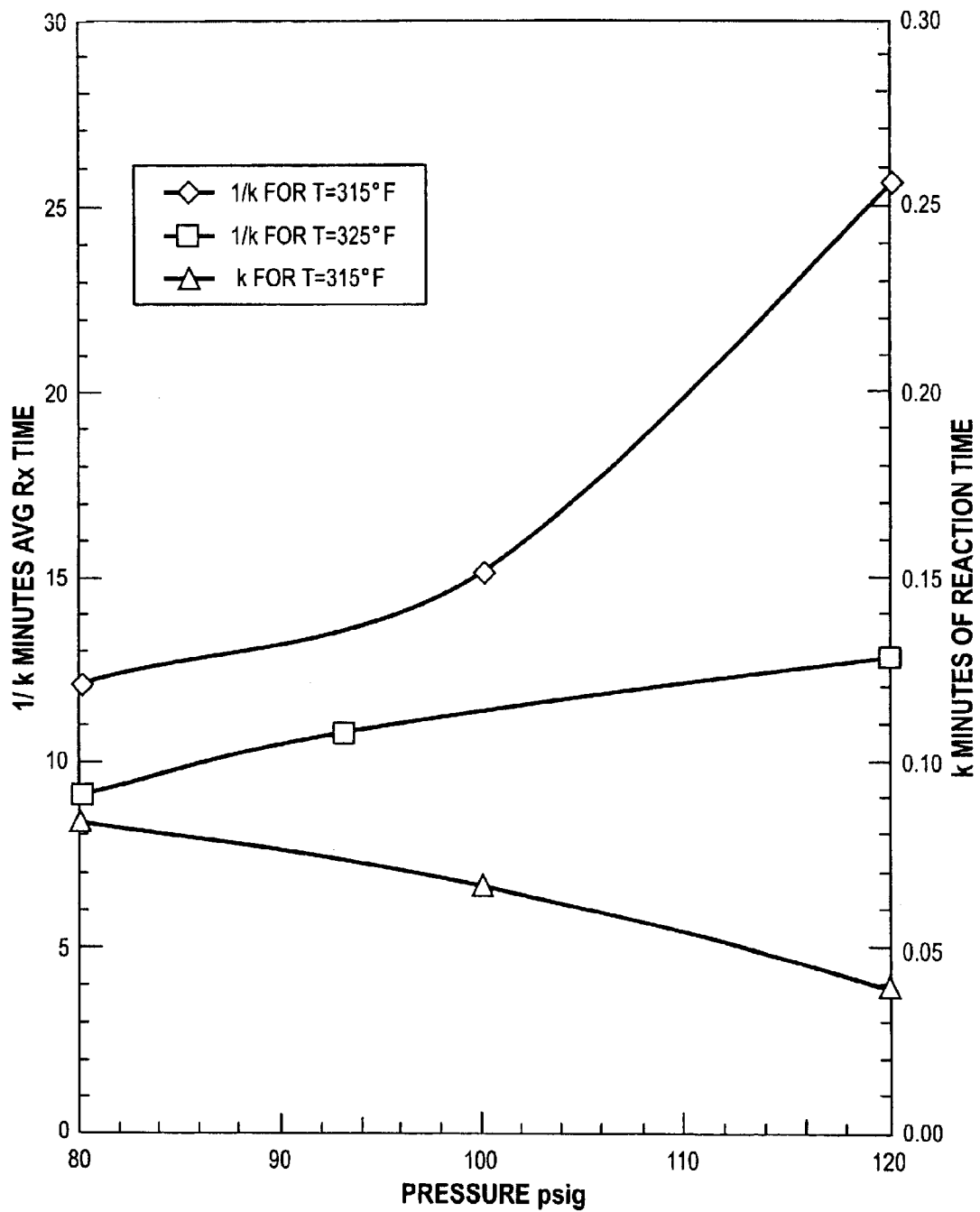
FIG. 4 shows the average reaction time (minutes) versus pressure (psig) for two series of steady-state, equilibrium condition, MAP/DAP-catalyzed reactions at constant temperature, and versus the corresponding reaction rate constant k for one series of data.

Additional series of steady-state catalyzed (MAP/DAP) urea hydrolysis reactions were carried out at various pressures, and mass balance calculations were performed according to the foregoing description to determine reaction rate constants, k, and average reaction times (1/k). The results are presented in FIG. 4, which shows that the reaction rate constant is relatively independent of pressure at 163° C. (325° F.) over the range of pressures tested, compared with results at 157° C. (315° F.). The reaction rate constant decreases with lower temperature and also decreases with increasing pressure.

In an acid-catalyzed hydrolysis process according to the invention, the reaction rate is sufficiently high that when there is a change in ammonia demand, the urea feed rate to the reactor can be changed proportionally, and within a matter of minutes the flow of ammonia and carbon dioxide leaving the reactor is proportional to the flow of urea entering the reactor, even when the temperature of the reactants is held constant. In the acid-catalyzed system wherein temperature and pressure are controlled to constant values, when the feed rate is changed in response to a change in ammonia demand, the reaction rate will change as the concentration of urea in the reactor changes to a new steady state, at which time the new production rate equilibrates with the new feed rate and, therefore, the new production rate equals the new demand rate.

The time necessary for a constant temperature and pressure hydrolysis system (catalyzed or non-catalyzed) to reach equilibrium after a change in demand is inversely proportional to the reaction rate constant (i.e., in the acid-catalyzed case the reaction rate constant is large and the time to reach equilibrium is small). At higher temperatures, the reaction rate constant is higher, and the time required to reach equilibrium is shorter. In a non-catalyzed hydrolysis process, the reaction rate constant is very small in a range of practical temperatures (e.g., 145° C. to 200° C.), so that a process employing constant temperature and pressure control would not achieve the same response time as an acid-catalyzed process, but such a process would still benefit from a predictable, substantially constant ammonia concentration in the gaseous product stream.

The time to reach equilibrium after a change in demand for a system controlled to constant temperature and pressure can be predicted from the foregoing. Thus, if "f" represents the fraction of change between the initial mass of urea in the reactor and the mass of urea in the reactor after a period of time "t" then the time required for a fractional change in urea mass (and, thus, reaction rate) can be calculated from equation 14, below.

$$t = \frac{1}{k}\ln\left[\frac{1}{(1-f)}\right] \quad [14]$$

From equation 14, it can be seen that the time necessary to make any fraction of the change between the initial mass of urea in the reactor and the final mass of urea in the reactor, regardless of the magnitude of change and as long as temperature and pressure are substantially constant, is a function of 1/k. For example, at a reaction temperature of 171° C. (340° F.) with a mixture of MAP and DAP as catalyst, the value of 1/k is 4.7 minutes. Thus, the time necessary to achieve 80% of a change in reaction rate (f=0.8) is about 8 minutes, and to achieve 95% of a change in reaction rate is about 14 minutes. For a non-catalyzed system operating at the same temperature, 1/k is about 60 minutes (extrapolated from measured data, see FIG. 3), which results in about 96 minutes necessary to achieve 80% of a change in reaction rate and about 180 minutes to achieve 95% of a change in reaction rate.

With a molar excess of MAP/DAP catalyst present, chemical equilibrium is established quickly with a constant feed rate of urea when temperature and pressure in the reactor are held constant. The composition of the liquid reaction mixture at equilibrium can be characterized by the ratio of MAP to DAP, and this ratio only depends on the temperature and pressure at which the process is carried out. The MAP to DAP catalyst ratio reflects the amount of chemically bound ammonia held in the catalyst. If the temperature and/or pressure are varied, then the MAP to DAP ratio will change, changing the amount of ammonia absorbed and thereby affecting the ammonia production rate until a new equilibrium is reached. However, by operating the reactor at constant temperature and pressure, the MAP to DAP ratio remains constant and will not interfere with the ammonia production rate at all. Since the operating temperature and pressure affect the MAP to DAP ratio, and these variables also affect the reaction rate constant k, it is difficult to determine if the MAP to DAP ratio exerts any influence on the reaction rate constant. Experimentally, we have determined that we can operate at a pressure at which the catalyst is nearly pure DAP and observe similar rapid reaction kinetics. Thus, we conclude that the various observed MAP to DAP mixtures are approximately equivalent as catalysts for urea hydrolysis.

Figure 5:
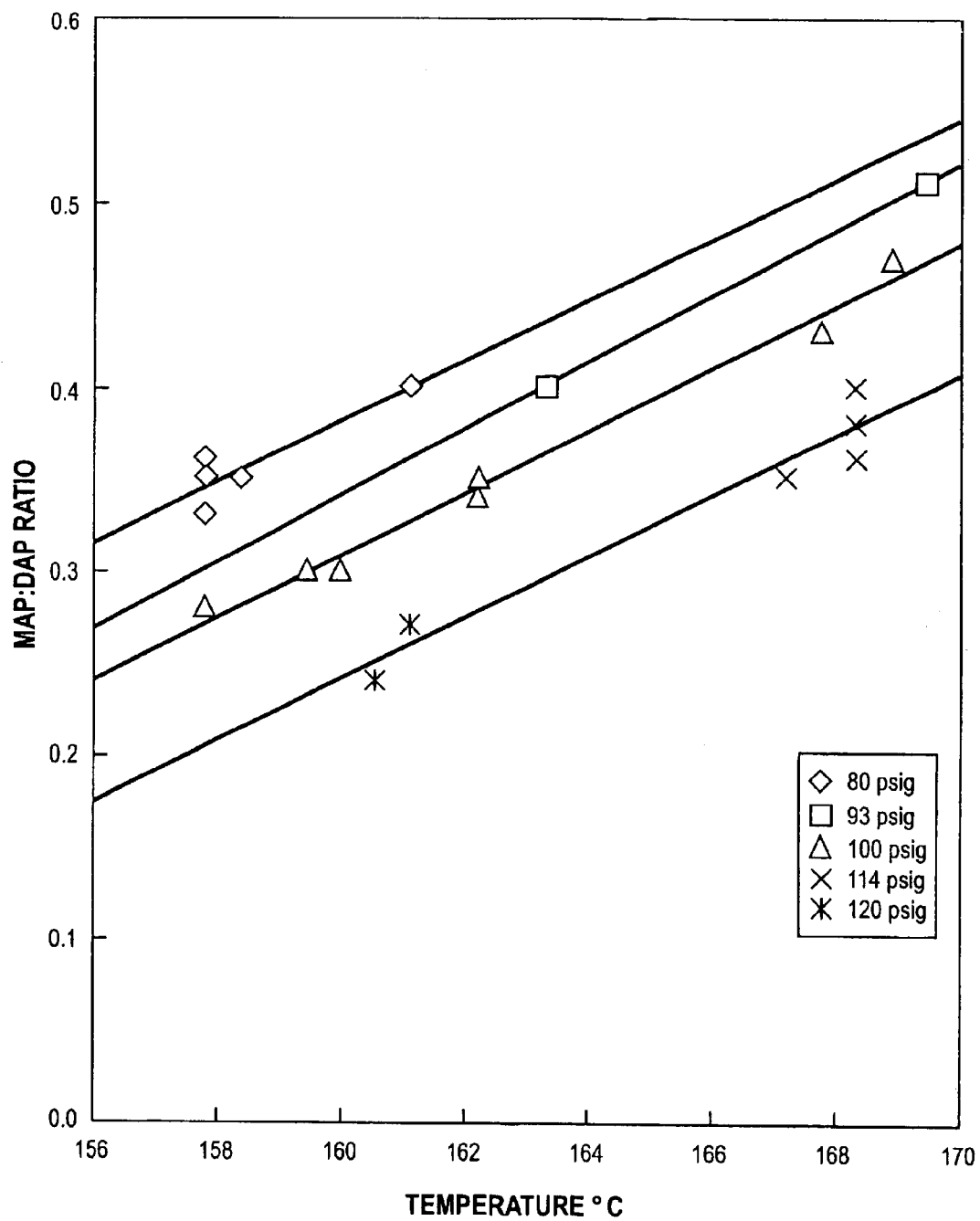
FIG. 5 is a plot of the measured ratio of MAP to DAP versus temperature (degrees Celsius) in several series of steady-state urea hydrolysis experiments carried out at various pressures (psig) with 40 weight percent (wt. %) and 50 wt. % aqueous urea feed; estimated isobars are provided.

Increasing the reactor temperature at constant pressure will increase the amount of MAP in the equilibrium mixture, so the MAP to DAP ratio increases with increasing temperature at constant pressure. FIG. 5, in which data generated at various steady-state temperature and pressure combinations for 40 wt. % and 50 wt. % aqueous urea feed solutions are presented, illustrates this effect. To assist in visualizing the effect, lines have been added to represent approximate correlations at various constant pressures. Higher pressure appears to depress the correlation line, but the slope of the line remains substantially constant.

Figure 6:
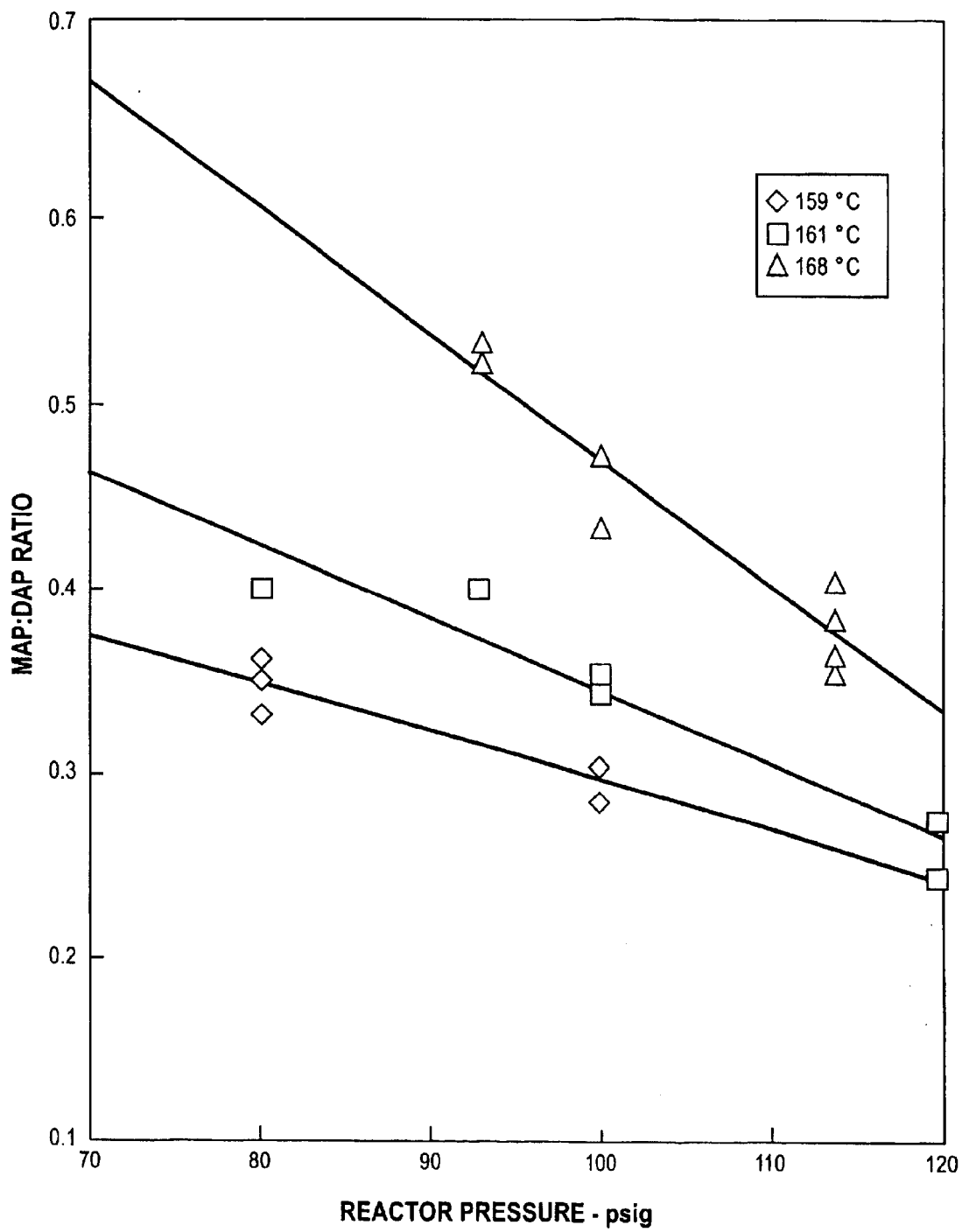
FIG. 6 is a plot of the measured ratio of MAP to DAP at various temperatures for the same series of experiments illustrated in FIG. 5, but plotted against reactor pressure (psig); estimated isotherms are provided.

Increasing the reactor pressure at constant temperature will increase the relative amount of DAP at equilibrium, decreasing the ratio of MAP to DAP. FIG. 6 shows the measured MAP to DAP ratio versus reactor pressure for selected data at narrow bands of constant temperature, with approximate correlation lines. FIG. 6 shows a general trend of increasing negative slope of the correlation line with increasing temperature, which reveals the greater sensitivity of the MAP to DAP ratio to pressure as the reaction temperature increases.

Figure 7:
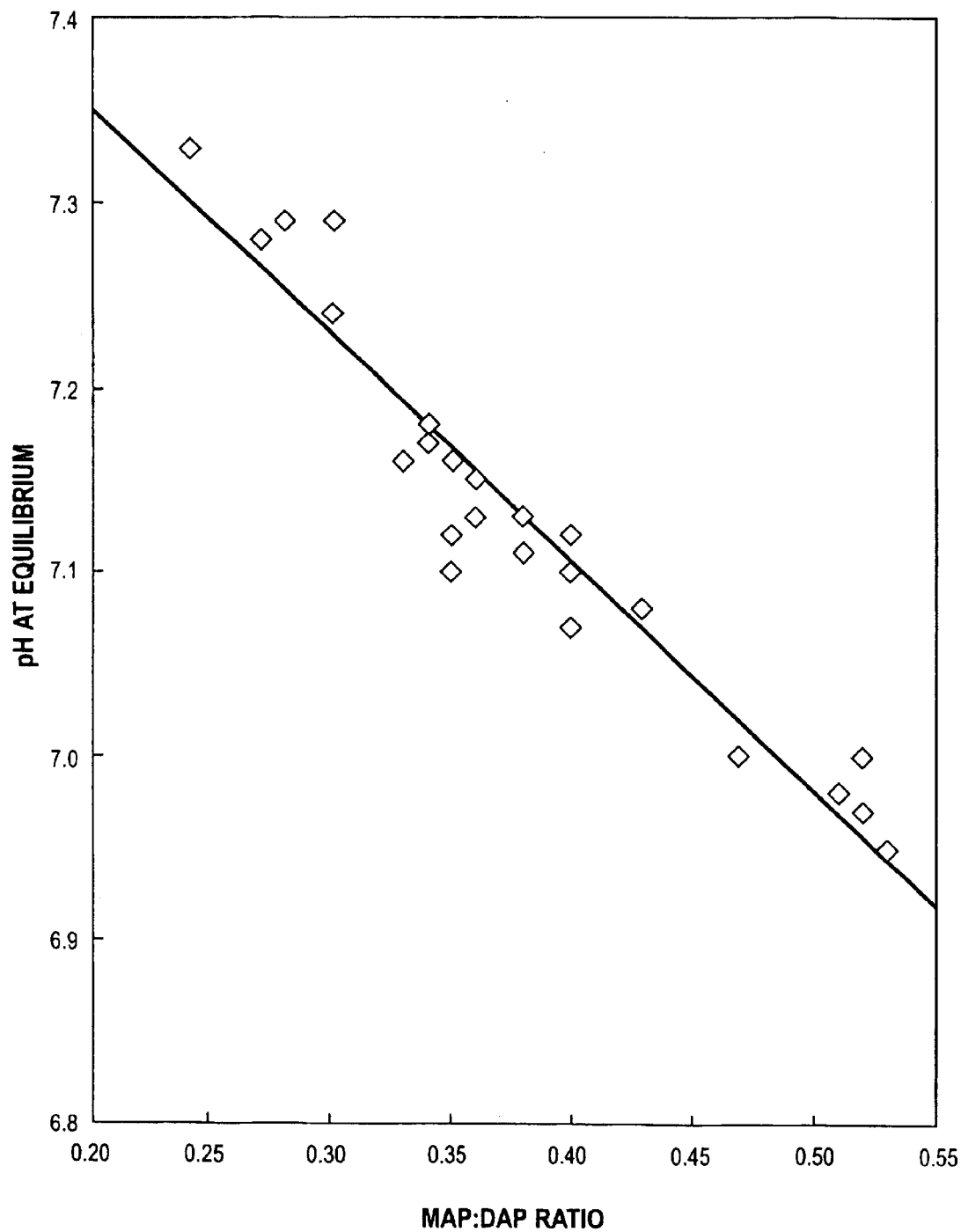
FIG. 7 is a plot of MAP/DAP ratio at equilibrium versus pH in dilute aqueous solutions.

The pH of MAP/DAP catalyst mixtures was measured for various samples in dilute (about 1 wt. %) aqueous solutions, and is illustrated in FIG. 7. Generally, the pH is in the neutral range, with the pH decreasing as the MAP to DAP ratio increases. The measured trend correlates well to the pH values for pure MAP (4.1, in 10 wt. % aqueous solution) and pure DAP (8.2, in 10 wt. % aqueous solution). Thus, the relationship between pH and the MAP to DAP ratio shows that pH can be used in process control schemes as an indicator of catalyst composition and, thus, reaction mixture composition.

Vapor-Liquid Equilibria: Effect on Water Content of the Reaction Mixture

Figure 8:
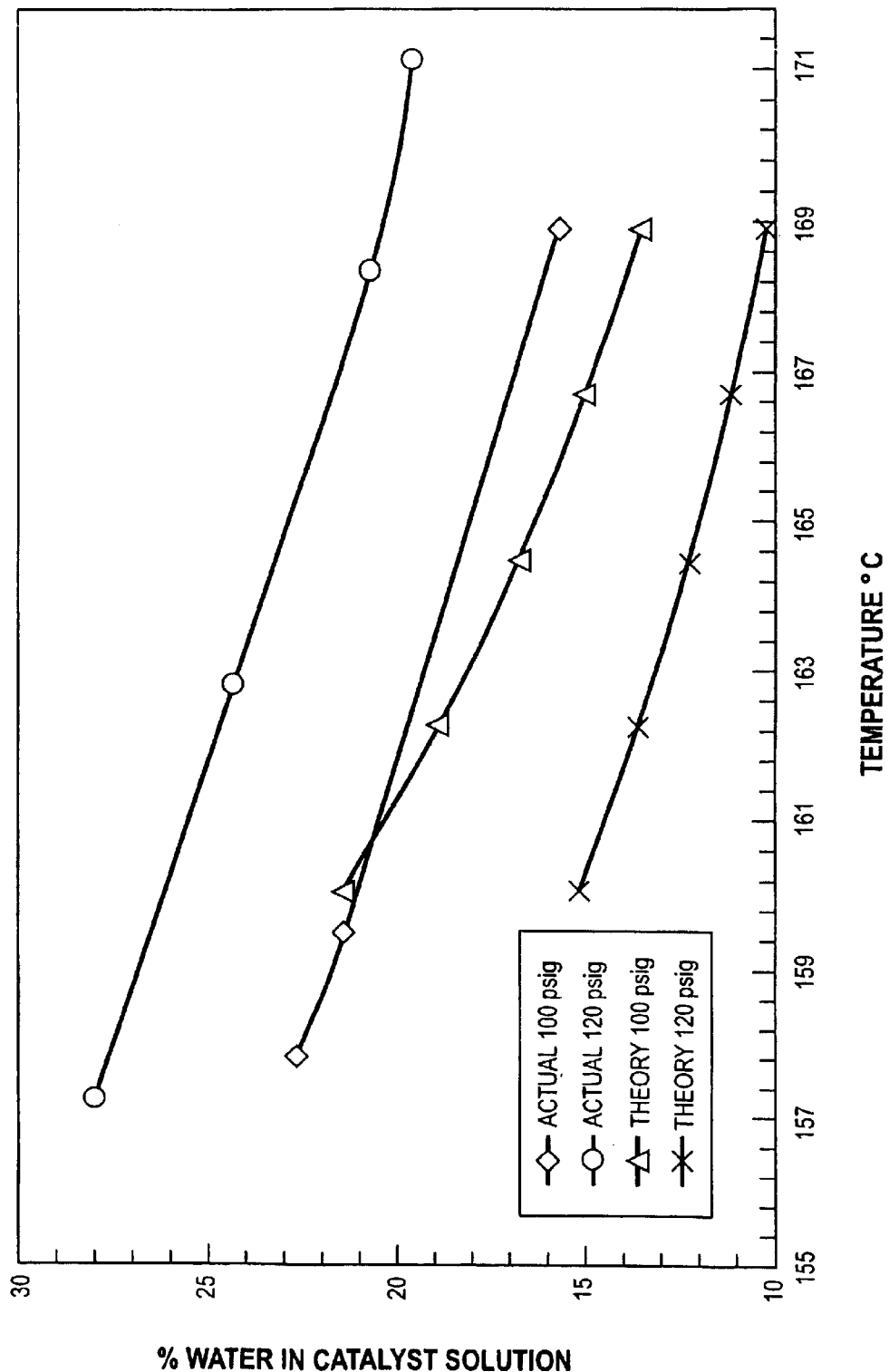
FIG. 8 is a plot of measured water concentration in a catalyzed (MAP/DAP) urea hydrolysis reaction mixture at steady-state for various temperatures at 100 psig and 120 psig; theoretical water concentration values based on the vapor pressure of water at similar temperatures and pressures are also presented for comparison.

The operating temperature and pressure of the reaction vessel along with the excess water added (over the stoichiometric amount needed to hydrolyze urea) will determine the concentration of water in the catalyst mixture at equilibrium. The gas discharging from the reactor will leave saturated with water vapor. FIG. 8 depicts the measured concentration of water in a catalyzed (MAP/DAP) urea hydrolysis reaction mixture at steady state for various temperatures at reactor pressures of 100 psig and 120 psig, when 50 wt. % urea solution is fed to the reactor. Theoretical water concentration values (determined by using Raoult's Law and Dalton's Law) based on the vapor pressure of water in the same range of temperatures are presented for comparison. If the mass ratio of water to urea is more than 1:1 (i.e., less than 50 wt. % urea), then lower reactor pressure is required for comparable concentrations, and if the mass ratio is less than 1:1 (i.e., more than 50 wt. % urea), then higher reactor pressure is required for comparable concentrations.

Theoretical Models for Vapor-Liquid Equilibrium

In either a catalyzed or a non-catalyzed urea hydrolysis reaction process at equilibrium, we have described the benefits of operating at a pressure uniquely related to the operating temperature for a specified concentration of aqueous urea feed. We have mentioned use of theoretical or experimental vapor-liquid equilibrium models to predict the operating pressure for a given operating temperature that will maintain the composition of the produced gas stream constant and, in particular, will ensure that the excess water supplied to the reactor with the feed solution will be discharged in the product gas stream.

The following demonstrates the theoretical calculation of the required operating pressure in an ammonium phosphate salt-catalyzed process, assuming a 50 wt. % aqueous urea feed, an operating temperature of 170° C., and 80 wt. % solids in the reaction mixture. Further, for simplicity, we will assume ideal molecular behavior, and thus the vapor liquid equilibria may be modeled using Raoult's Law and Dalton's Law. More sophisticated theoretical models may, of course, be employed if desired, as may empirical correlations developed by experimental means.

At 170° C., the corresponding vapor pressure of water is 114.9 psia (taken from steam tables). With these data and assumptions, Raoult's Law is written as follows:

$$p_i = x_i P_i \qquad [15]$$

and Dalton's Law is:

$$p_i = P y_i \qquad [16]$$

wherein $p_i$ is defined as the partial pressure of component i, $P_i$ is defined as the vapor pressure of component i at the operating temperature of the system (170° C. in this case),
$x_i$ is the mole fraction of component i in the liquid phase, $y_i$ is the mole fraction of component i in the vapor phase, and P is the total pressure, which is equal to the sum of the partial pressures of all components of the vapor phase (i.e., $P = P_1 + P_2 + \ldots + p_n$, where n is the number of components in the vapor phase). Since these equations employ mole fractions, Table 1 below describes the various streams for the case in this example as mole fractions for an experimental result consistent with the case in this example.

TABLE 1

|  | Wt. % | Molecular Weight | Mole Fraction |
|---|---|---|---|
| Feed |  |  |  |
| Urea | 49.3 | 60 | 0.2258 |
| Water | 50.7 | 18 | 0.7742 |
| Product |  |  |  |
| Ammonia | 27.9 | 17 | 0.3685 |
| Water | 35.9 | 18 | 0.4473 |
| Carbon Dioxide | 36.2 | 44 | 0.1842 |
| Reaction Mass |  |  |  |
| MAP | 17.2 | 115 | 0.0869 |
| DAP | 61.8 | 132 | 0.2721 |
| Urea | 1.5 | 60 | 0.0145 |
| Water | 19.4 | 18 | 0.6264 |
| Carbon Dioxide | 0 | 44 | 0 |
| Ammonia | 0 | 17 | 0 |

The net reaction in a urea hydrolysis process is described in equation 1 below.

$$NH_2CONH_2 + H_2O + heat \rightarrow 2NH_3 + CO_2 \qquad [1]$$

At steady state, all water in excess of the molar amount required for the reaction must exit with the product gases. Allowing for the excess water in a 50% solution, we can write the equation showing the excess water as follows:

$$NH_2CONH_2 + H_2O + 2.33 H_2O \rightarrow 2NH_3 + 2.33 H_2O + CO_2 \qquad [17]$$

It can be calculated from Raoult's Law that the partial pressure due to water should be,

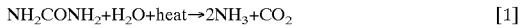

$$P_{water} = 0.6264 \times 114.9 \text{ psia} = 71.97 \text{ psia},$$

and by rearranging Dalton's Law, the total pressure is given by:

$$P = P_i / Y_i;$$

thus

$$P = 71.97 \text{ psia}/0.4473 = 160.9 \text{ psia} = 146.2 \text{ psig}.$$

This value for P (146.2 psig) is the predicted operating pressure, subject to the stated assumptions, that should enable continuous operation at the selected temperature, while maintaining a substantially constant composition and mass of urea in the reactor.

This calculation can be performed for various temperatures in a range of interest to determine a theoretical "equilibrium line" relating operating temperature and pressure (see FIG. 1, for example). This equilibrium relationship can also be determined by experimental means.

In an actual process experiment conducted with 50 wt. % urea and operating at a temperature of 171° C., we observed that a water balance was achieved at about 120 psig. The difference between the predicted and experimentally determined value is most likely caused by non-ideality inherent in the real molecular behavior, which is not modeled accurately using Raoult's and Dalton's Laws.

Preferred Embodiments

Based on the relationships between reactor temperature, pressure, reaction mixture composition, and reactant feed composition, which determine the reaction rate and reaction rate constant as described above, various embodiments of processes for acid-catalyzed and non-catalyzed urea hydrolysis according to the invention are described below.

Acid-Catalyzed Hydrolysis Using Aqueous Urea

One embodiment of the invention provides a process for acid-catalyzed hydrolysis of aqueous urea to quantitatively produce ammonia on demand, which maintains the liquid reactants at substantially constant solids concentration and produces a product gas mixture of substantially constant composition, e.g., during a change in ammonia demand, including the steps of: receiving a control signal proportional to the demand rate for ammonia; feeding aqueous reactants including urea of a known and substantially constant composition and water to a reactor at a rate proportional to the demand rate to provide a reaction mixture in the reactor that contains an excess quantity of acid catalyst; reacting the reaction mixture including urea, water and acid catalyst at substantially constant temperature and substantially constant pressure to produce a gaseous product stream including ammonia, carbon dioxide, and water vapor at a substantially constant composition; supplying necessary heat to the reactants (heat of reaction plus latent heat of vaporization for the excess water fed to the reactor) at a rate proportional to the urea feed rate to maintain a substantially constant reaction temperature; and controlling the pressure of the reactor by means of a pressure control valve, for example, which maintains the operating pressure of the reactor substantially constant while venting the produced gases into a conduit for supply to the external use.

Figure 9:
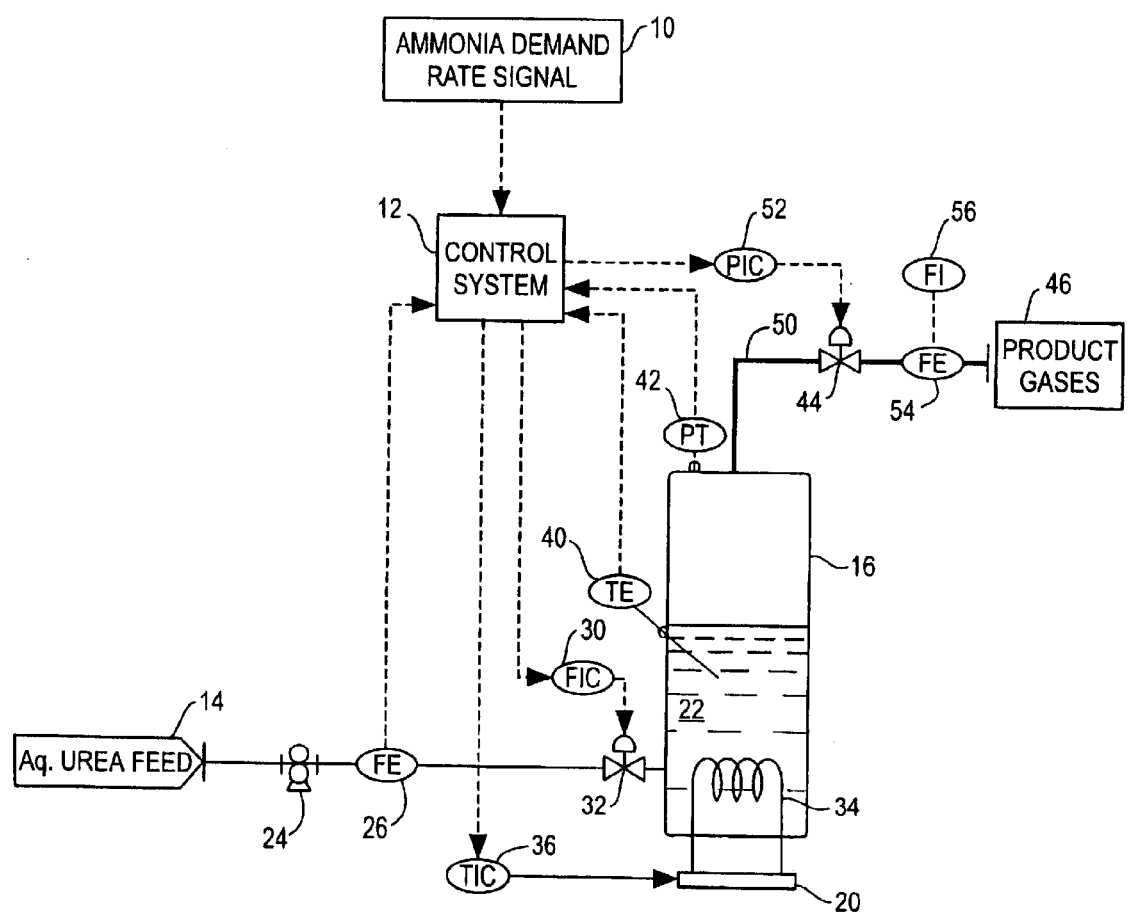
FIG. 9 is a flow diagram of an apparatus according to the invention.

An apparatus according to this embodiment is illustrated in FIG. 9. In this system, the demand rate signal for ammonia 10 received from an external process can be, for example, proportional to the fuel combustion rate, the concentration of NOx detected in the flue gas stream in one or more locations, or many other similar measurements that correlate with the demand for ammonia in that process. The ammonia demand rate signal 10 is connected to a urea hydrolysis control system 12 as a primary process control input. Following a change in demand rate signal 10, the control system 12 responds by making a proportional change in input of aqueous urea 14 and energy (e.g., heat) input to the reactor vessel 16 via a heater 20. Changing the aqueous urea feed rate will bring about a change in the urea concentration of the reaction mixture 22, which in turn changes the reaction rate (see equation 11). After a matter of minutes, the urea concentration will equilibrate and the new reaction rate will equal the demand rate. Maintaining constant temperature and pressure during the change will keep the composition of the catalyst and particularly the water content constant.

In a preferred control system for this embodiment, the ammonia demand rate signal 10 is input to the process controller 12. A supply of aqueous urea 14 of known and constant concentration is continuously pumped to the reactor in response to the demand rate signal 10 by means of a metering pump 24, a mass flow monitor 26, a mass flow controller 30, and a flow control device, such as a flow control valve 32, that responds to the flow controller 30 output. The demand rate signal 10 provides the set point for the urea flow controller 30, and the flow controller 30 adjusts the flow control valve 32 by monitoring the mass flow delivered to the reactor via the flow monitor 26 to match the requirement. An excess of process water is supplied in a substantially constant mass ratio as part of the urea feed solution 14.

Heat input to the reaction mixture 22 inside the reactor vessel 16 can be effected by means of the heater 20 with electric heating coils as a heat transfer device 34, or steam or other heat transfer fluids supplied to the heat transfer device 34 (e.g. a tubular heat exchange coil) submerged in or in thermal contact with the liquid reactants. In the case of electric means, the supply of heat to the reactants is regulated in proportion to the urea mass flow by controlling the power applied to the heat transfer device 34 (electric resistance coils) with a temperature control device 36. In the case of a steam (or other heat transfer fluid) heater, the flow of steam to a heat transfer device 34 (heat transfer coil) is varied in proportion to the mass flow rate of aqueous urea 14 to the reactor vessel 16 using a mass flow sensor, flow controller and flow control valve (not shown in FIG. 9).

A temperature sensing device, such as a thermocouple 40, can be used to provide trim control on the heater 20 to enhance control over the temperature of the reaction mixture 22. The operating pressure in the reactor vessel 16 is monitored by a pressure transmitter 42, and is changed by a variable restriction device (e.g., a control valve 44) mounted in a product gas (46) discharge pipeline 50 and controlled by a pressure controller 52. In a most preferred embodiment of the invention, such a pressure control valve 44 is operated to maintain a selected substantially constant pressure in the reactor vessel 16 independent of the ammonia demand rate signal 10. Thus, the pressure control valve 44 is normally closed (e.g., when the system is off-line or on stand-by) and is controlled to open as necessary to discharge product gas 46 to maintain a substantially constant pressure in the reactor vessel 16 and in the discharge line 50 immediately upstream (with respect to the gas flow direction) of the control valve 44. Other control sensors for monitoring temperatures, pressures, liquid level of reaction mixture 22, pH of reaction mixture 22, conductivity of reaction mixture 22, product gas 46 mass flow (e.g., a mass flow monitor 54 with a flow indicator 56) or other measurements may be valuable to enhance process control in various ways.

The principal advantages of the acid-catalyzed processes are evident in comparison with the non-catalyzed urea hydrolysis processes, and derive from the chemical reaction mechanism and much faster reaction rate. The acid-catalyzed process may be advantageously operated at a substantially constant temperature and pressure in a control scheme that provides improved performance (e.g., ability for ammonia production to meet demand, especially quickly changing in response to changes in demand, and without changing the product gas composition). The acid-catalyzed production of ammonia in a product gas stream of substantially constant composition closely follows the demand, and the reactor reaches equilibrium after a change in demand much faster and more efficiently than in a non-catalyzed hydrolysis process.

In general, this embodiment is quite flexible and may be operated successfully over reasonably broad ranges of the key process operating variables. For example, the aqueous urea concentration may vary from an arbitrary low value such as 10 wt. % up to and including a nearly equimolar solution at about 76 wt. %. However, in consideration of the energy required to evaporate any water fed to the reactor fed in excess of the stoichiometric amount required for hydrolysis (which provides a practical constraint on the more dilute end of the concentration range) and the solubility of urea in water (which requires maintaining the solution at an elevated temperature as it becomes more and more concentrated), it is preferable to use aqueous urea in a concentration range from about 35 wt. % to about 60 wt. %. The most preferred concentration range is from about 40 wt. % to 50 wt. %, wherein 40 wt. % arguably provides a useful standard for comparison of process embodiments, since this concentration is particularly advantageous for systems using aqueous urea. The reactor operating temperature should be greater than about 150° C., and to achieve a reasonably fast reaction time (under about 10 minutes) a temperature of at least 155° C. is more preferred. A preferred temperature range is about 155° C. to about 175° C., and the most preferred range is about 168° C. to about 172° C. The operating pressure affects the solids concentration of the reactant solution, as has been described previously. With a MAP/DAP catalyst mixture, to keep the solids concentration in the range from about 70 wt. % to about 80 wt. % (equivalent to about 20 wt. % to 30 wt. % water), the reactor pressure should be controlled in the range of about 80 psig to about 200 psig.

Acid-Catalyzed Hydrolysis Using Molten Urea and Separate Water Feed

Another embodiment of the invention provides a process for quantitative conversion of urea to ammonia on demand that employs a supply of molten urea as a primary feed stream and a separate supply of water for the process water requirement, including the steps of: receiving a control signal proportional to the demand rate for ammonia; feeding molten urea to a reactor at a rate proportional to the demand rate; feeding process water to the reactor at a rate proportional to the urea feed rate to provide a reaction mixture containing an excess quantity of acid catalyst; reacting the reaction mixture including urea, water and acid catalyst at substantially constant temperature and substantially constant pressure to produce a gaseous product stream including ammonia, carbon dioxide, and water vapor at a substantially constant composition; supplying necessary heat to the reactants (heat of reaction plus latent heat of vaporization for the excess water fed to the reactor) at a rate proportional to the urea feed rate to maintain a substantially constant reaction temperature; and controlling the pressure of the reactor by means of a pressure control valve, for example, which maintains the operating pressure of the reactor substantially constant while venting the produced gases into a conduit for supply to the external use.

In a preferred method according to this embodiment, purified and de-ionized water is employed for the process water supply to avoid contamination of the reaction solution.

Figure 10:
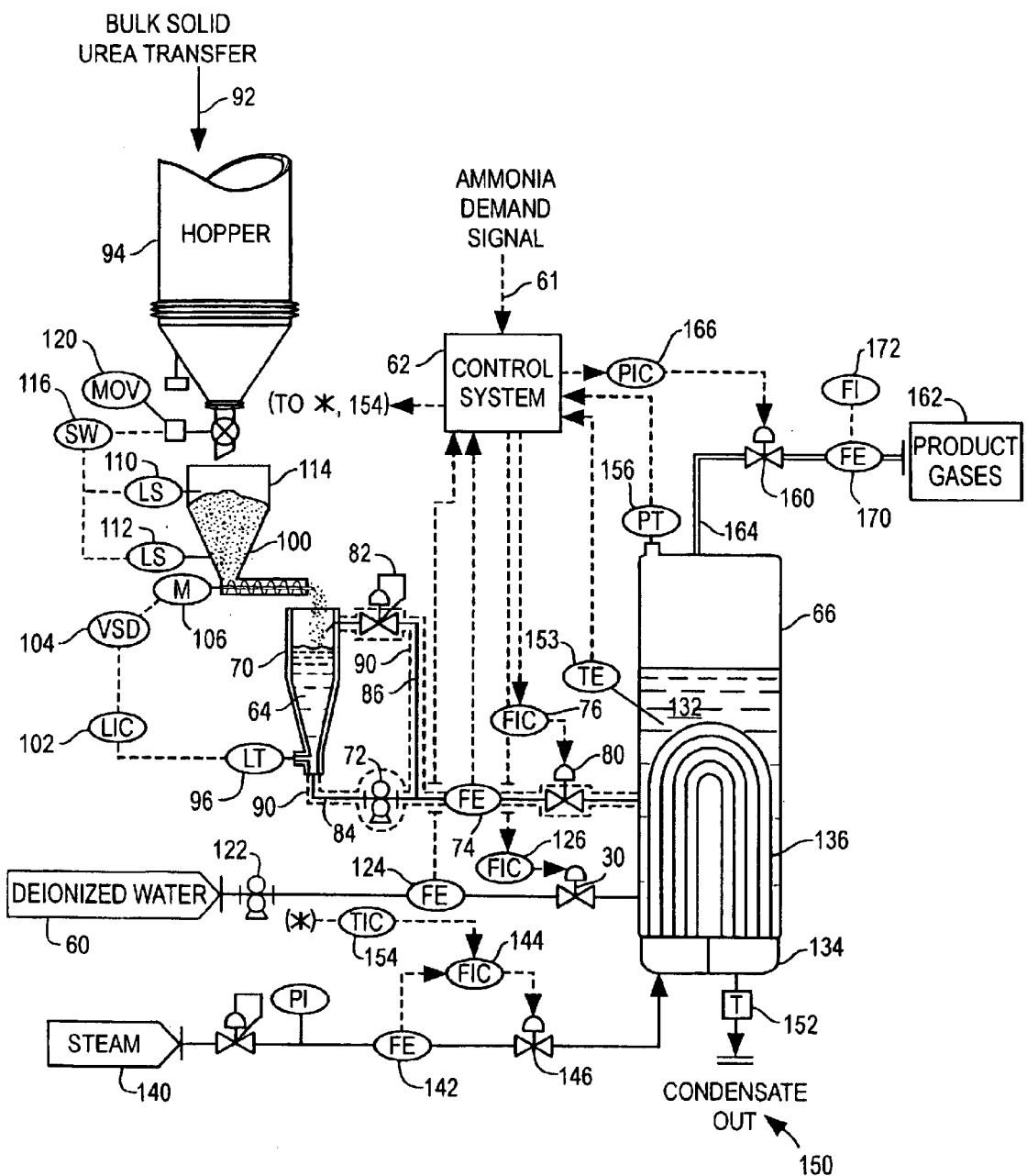
FIG. 10 is a flow diagram of an apparatus according to the invention.

An apparatus according to this embodiment is illustrated in FIG. 10, which is similar to FIG. 9, but has been adapted for supply of urea in molten form and process water 58 as separate streams. In a preferred control scheme for this embodiment, an ammonia demand signal 60 is input to a process controller 62. A supply of molten urea 64 is continuously pumped to a reactor 66 in response to the demand signal 60 by means of a continuous melting system 70, a metering pump 72, a mass flow sensor 74, a mass flow controller 76, and a flow control device that responds to the flow controller 76 output, such as a flow control valve 80.

It is advantageous to provide recirculation of molten urea 64 to the melter 70 using a back pressure regulating valve 82 to control the supply pressure of the molten urea 64 to the reactor 66. All of these components and fluid conduits 84 and 86 are heated by tracing (or jacketing) 90 and maintained above the melting point of the molten urea 64 with a heat transfer fluid, such as a regulated supply of steam, or by electric heat tracing. Solid urea 92 in the form of a granule or prill is conveyed to a hopper 94, from which it is fed to the melter vessel 70 using, for example, a level sensor 96 in the melter 70 to provide a control signal to govern the rate of addition of solid urea 92 to the melter 70. A variable speed screw feeder 100 (or equivalent feeding device) meters the solid urea 92 into the melter 70 at a controlled rate in response to a signal generated by the level sensor 96. This can be done using a level controller 102 and a variable speed drive 104 for a screw feeder 100 motor 106. Additional useful control items for the feeder 100 can include level sensors 110 and 112 for a smaller hopper 114 of the variable speed screw feeder 100, a switch 116 to operate a rotary valve 120, enabling periodic refilling of the smaller hopper 114.

The melter 70 is sized to minimize the retention time of the molten urea 64. Preferably, the retention time of the molten urea 64 in the melter 70 is less than two hours, and most preferably the retention time is less than one hour. The ammonia demand signal 60 provides the set point for the molten urea flow controller 76, and the controller 76 adjusts the control valve 80 by monitoring the mass flow (via flow element 74) delivered to the reactor to match the requirement.

In this preferred embodiment, process water 58 (e.g., deionized water) is supplied in a substantially constant mass ratio to the urea 64 using a separate metering pump 122, a mass flow sensor 124, a flow controller 126, and a flow control valve 130.

Heat input to the reactants 132 in the reactor 66 may be effected by means of electric heating coils, steam or other heat transfer fluids supplied to a heater 134 (e.g., with a tubular heat exchange coil 136) submerged in or in thermal contact with the liquid reactants 132, as described above. If steam is used (as shown in FIG. 10), the heat input is regulated by controlling the flow of steam 140 with a flow sensor 142, a flow controller 144 and a control valve 146 in response to the ammonia demand signal 60, and a steam condensate outlet 149 is fitted with an appropriate trap 150. For practical purposes, the steam supply can have a main shut off valve 151 and a pressure indicator 152. A temperature sensor 153, such as a thermocouple, may be used to provide trim control via a controller 154 to enhance control over the temperature of the reactants 132.

The operating pressure in the reactor vessel 66 is monitored by means of a pressure transmitter 156, and is controlled by means of a variable restriction device (e.g., a control valve) 160 mounted in a product gas 162 discharge pipeline 164 and controlled by a controller 166.

In a most preferred embodiment of the invention, such a pressure control valve 160 is operated by the controller 166 to maintain a selected, substantially constant pressure in the reactor independent of the ammonia demand signal 60. Thus, the pressure control valve 160 is normally closed and is controlled to open as necessary to discharge produced gas 162 to maintain a substantially constant pressure in the reactor 66 and in the discharge line 164 immediately upstream (with respect to the gas flow direction) of the valve 160. Other sensors for monitoring the temperature, pressure, liquid level, pH, conductivity, product gas mass flow (e.g., a flow sensor 170 and a controller 172) or other measurements may be valuable to enhance the process control in various ways.

This embodiment employs molten urea with a separate process water stream, and affords several unique advantages in comparison with aqueous urea processes. Use of molten urea, for example, enables a significant reduction in equipment and facilities. Solid urea storage and handling systems are required, but urea dissolving equipment and storage equipment and handling systems are not required. Also, because the process water is supplied separately, the ratio of urea to water in the feed may be easily varied, and doing so does not impact the raw materials feed systems. In an aqueous urea system, changing the concentration of the solution could require heating of the storage and supply system. Therefore, the process system of this embodiment is more space efficient and less complicated.

This embodiment is just as flexible as the aqueous urea embodiment and, in general, may be operated in the same ranges for the principle process variables, allowing for the separate supply of urea and process water. The preferred and most preferred operating conditions are generally the same as were described previously for the acid-catalyzed, aqueous urea system. Preferred operating conditions for the molten urea feed system are discussed separately below.

Acid-Catalyzed Hydrolysis Using Molten Urea Feed and Steam:
Reduced Reactor Volume Another embodiment of the invention provides a process for quantitatively converting urea to ammonia on demand in a reactor of significantly reduced volume, including the steps of: feeding molten urea to a reactor at a rate proportional to the ammonia demand; feeding process water in the form of steam to the reactor at a rate proportional to the urea supply rate; using the sensible heat of the molten urea and the latent heat of condensation of a portion of the steam to supply a portion of the necessary process heat; using the uncondensed steam to supply the water vapor for the equilibrium mixture in the discharged gas (which saves the heat of vaporization of this water); supplying the balance of the process heat in proportion to the urea supply rate to control the temperature in the reactor at a desired temperature; reacting the urea and water with an acid catalyst in the reactor to form a gaseous product stream including ammonia, carbon dioxide, and water vapor; and discharging the product gases into a conduit to the external use while maintaining a substantially constant pressure in the reactor by means of a pressure control valve (or equivalent device). The operating temperature and pressure are maintained at substantially constant values as has been described previously. One advantage of this embodiment is the use of the sensible heat of the molten urea and the latent heat of condensation of the steam, and avoiding the need to evaporate water from the liquid reactants solution which, when when combined, provides about 65% of the process heat requirement with these reactant feed streams. This reduces the supplemental heat requirement to only about 35% of that required in the aqueous urea case (at constant urea to water mass ratio). The much smaller heat requirement (and, hence, smaller heat transfer device required) in this embodiment enables a reduction of the volume of reactant solution, and provides a process system that allows for a significantly smaller reactor vessel with all of the associated benefits.

Figure 11:
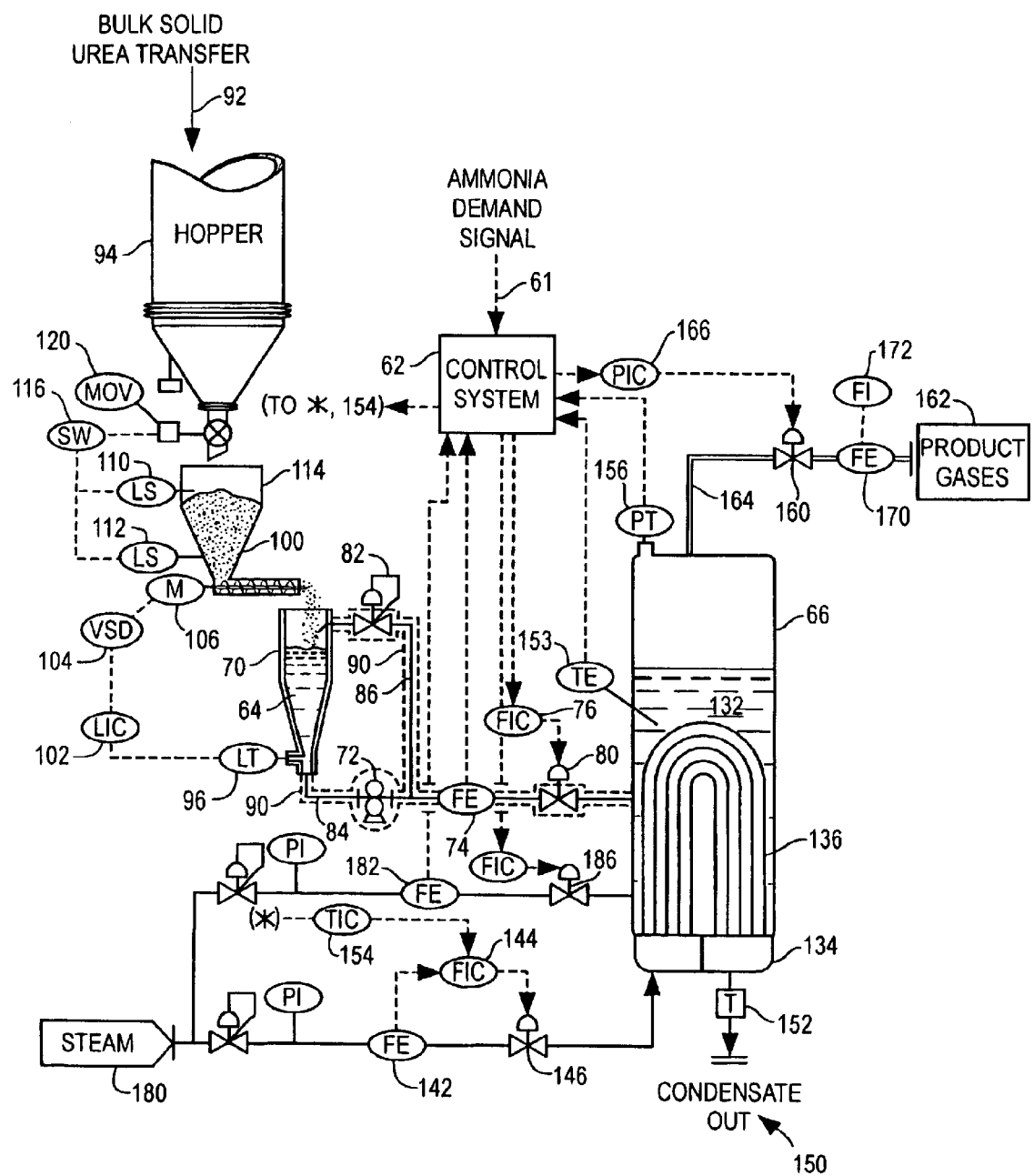
FIG. 11 is a flow diagram of an apparatus according to the invention.

An apparatus according to this low volume reactor embodiment is illustrated in FIG. 11, which is the same as FIG. 10, except that it has been adapted for supply of process water in the form of steam and FIG. 11 does not show a smaller reactor 66, which is possible in this embodiment.

In a preferred control scheme for this embodiment, the ammonia demand signal 60 is input to the process controller 62 and a supply of molten urea 64 is continuously pumped to the reactor 66 as in the embodiment described above in connection with FIG. 10.

Process water in the form of steam 180 is supplied in a substantially constant mass ratio to the molten urea 64 mass flow rate using a separate mass flow sensor 182, a flow ratio controller 184, and a flow control valve 186. For practical purposes the process steam line can have a shut off valve 190 and a pressure indicator 192.

Supplemental heat input to the reactants 132 may be effected by means of a heater 134, for example using a tubular heat exchange coil 136 (e.g., electric or with a heat transfer fluid such as steam, as shown in FIG. 11) submerged in or in thermal contact with the liquid reactants 132, as described above. If steam 140 is used, as shown, the heat input is regulated by controlling the flow of steam with a mass flow sensor 142, a flow controller 144 and a flow control valve 146 responding to the ammonia demand signal 60. A temperature sensor, such as a thermocouple 153, may be used to provide trim control on the reactants 132 temperature with a temperature controller 154.

Reactor pressure and product gas flow are controlled as described above in connection with FIG. 10.

This embodiment may be operated at conditions equivalent to the previously described embodiments with equivalent ratio of urea to process water fed to the reactor (urea feed concentration) and identical temperature and pressure ranges. The most significant difference is the reduction in the supplemental heat required, as has been described, which enables use of a smaller heat transfer device and a smaller reactor vessel.

Acid-Catalyzed Hydrolysis—Energy Efficient Process Embodiment

Another embodiment of the invention provides an energy efficient process for acid-catalyzed hydrolysis of urea to quantitatively produce ammonia on demand, in which the mass ratio of urea to water as continuously fed to the reactor is increased, requiring less process heat input to the reactor to evaporate excess water, and which operates with relatively higher solids concentration in the liquid reaction mixture. In this embodiment, several variations are possible.

Thus, in a typical aqueous urea process as illustrated in FIG. 9, more concentrated aqueous solutions (e.g. greater than 40 wt. % to about 76 wt. %, preferably greater than about 40 wt. % to about 50 wt. %) of urea may be supplied as the feed stream up to a concentration corresponding to nearly an equimolar mixture of about 76 wt. %. In such an embodiment, the feed solution storage and handling temperature must be adjusted based on the solubility of the urea in the aqueous solution. Thus, for 76 wt. % urea, the temperature of the solution must be maintained above 70° C. The storage and handling equipment would all need to be maintained at a temperature somewhat above the saturation temperature for the given concentration of aqueous urea.

Another variation, based on process equipment illustrated in FIG. 10, uses molten urea and liquid water (e.g., de-ionized water) fed separately to the reactor, but (at steady state) in a ratio equivalent to a more concentrated aqueous solution, preferably about 50 wt. % to about equimolar. Still another variation, based on process equipment illustrated in FIG. 11, uses molten urea and steam fed in a ratio (at steady state) equivalent to a more concentrated aqueous solution, preferably about 50 wt. % to about equimolar. As described below, the urea feed (aqueous, solid, or molten urea) rate can be changed in an amount disproportionate to a change in the ammonia demand rate (e.g., halted or significantly increased).

The common requirement is the reduction of excess process water (amount greater than is needed just for the urea hydrolysis reaction) in the feed to the reactor, which otherwise must be removed at steady state with the ammonia and carbon dioxide gases to avoid accumulation or depletion of water in the reaction mixture. The chief advantage of this embodiment in its various forms is energy efficiency calculated per unit mass of ammonia generated. As the ratio of urea and water fed to the reactor approaches equimolar flow rates of urea and water, the excess water in the system is minimized, and therefore the extra energy required to evaporate excess water is also minimized.

Increasing the ratio of urea to water fed to the reactor is possible in an acid-catalyzed urea hydrolysis reactor because the reaction kinetics remain very fast, even when the solids concentration of the reactant solution is relatively high. The operating temperature and pressure in the catalyzed process remain in a reasonable range.

In the non-catalyzed urea hydrolysis process, in which the reaction rate is much slower, the reaction rate constant decreases with increasing solids concentration in the reaction solution. To control the solids concentration in a favorable range, for example from about 35 to 40 wt. % solids, the required operating pressure increases as the ratio of urea to water fed to the reactor increases. FIG. 1 shows calculated equilibrium temperature vs. pressure curves for non-catalyzed urea hydrolysis using urea to water feed ratios equivalent to 40 wt. %, 50 wt. %, and 60 wt. % urea.

Thus, one advantage of the acid-catalyzed embodiment relative to the non-catalyzed system is the relative tolerance to a wide range of urea-to-water feed ratios. To further illustrate this effect, consider a comparison standard system employing 40 wt. % aqueous urea (urea to water weight ratio 0.667:1.0), operating the reactor at constant temperature in the range 168° C. to 172° C. and constant pressure in the range 80 psig to 100 psig. The heat requirement of the process may be reported as BTU per pound of ammonia generated (BTU/(lb $NH_3$)). In this case, the total heat requirement (not including loss to the environment) is 4554 BTU/(lb $NH_3$), and all of this heat is supplied by a heater (e.g., an internal heating coil). The energy efficiency of various cases may now be illustrated by comparison.

In a first case, the urea-to-water weight ratio is 1.0:1.0 (corresponding to 50 wt. % aqueous solution). The acid-catalyzed reactor is operated at a constant temperature in the range 168° C. to 172° C., and a constant pressure in the range 115 psig to 125 psig. The corresponding water content of the equilibrium reaction mixture is in the range 18 wt. % to 25 wt. %. The total heat requirement (not including loss to the environment) for this case is 3504 BTU/(lb $NH_3$). The supplemental heat supplied by the heater (e.g., heating coil) depends on the process variation. When steam and molten urea are fed as reactants, the value is 1091 BTU/(lb $NH_3$), but for aqueous urea the value is the full 3504 BTU/(lb $NH_3$).

In a second case, the urea-to-water weight ratio is 1.51:1.0 (corresponding to about 60 wt. % aqueous urea solution). The acid-catalyzed reactor is operated at a constant temperature in the range 168° C. to 172° C., and a constant pressure in the range 190 psig to 210 psig. The corresponding water content of the equilibrium reaction mixture is in the range 15 wt. % to 20 wt. %. The total heat requirement (not including loss to the environment) for this case is 2805 BTU/(lb $NH_3$). The supplemental heat supplied by the heater (e.g., heating coil) when steam and molten urea are fed as reactants is 1097 BTU/(lb $NH_3$), and for aqueous urea the value is the full 2805 BTU/(lb $NH_3$).

In a third case, the urea-to-water weight ratio is 2.63:1.0 (corresponding to 72.5 wt. % aqueous urea solution). The acid-catalyzed reactor is operated at a constant temperature in the range 190° C. to 200° C., which is above the melting point of the catalyst mixture, and a constant pressure in the range 115 psig to 125 psig. At these conditions, the corresponding water content of the equilibrium reaction mixture is in the range 1 wt. % to 2 wt. %. The total heat requirement (not including loss to the environment) for this case is 2244 BTU/(lb $NH_3$). The supplemental heat supplied by the heater (e.g., heating coil) steam and molten urea are fed as reactants is 1140 BTU/(lb $NH_3$), and for aqueous urea the value is the full amount 2244 BTU/(lb $NH_3$). These comparison cases demonstrate the flexibility of the acid-catalyzed process and the energy savings associated with this process embodiment.

Acid-Catalyzed Hydrolysis—Low Pressure Embodiment

Still another embodiment of the invention provides a process for acid-catalyzed urea hydrolysis for quantitative production of ammonia on demand, that is operated at a reactor pressure below 20 psig, which may employ variations in the reactor feed adapted to aqueous urea (see FIG. 9), molten urea and water fed separately (see FIG. 10), or molten urea and steam fed separately (see FIG. 11); which employs a molten catalyst mixture of MAP and DAP to achieve rapid reaction kinetics; and which operates at a temperature at least slightly above the melting point temperature of the catalyst mixture (e.g., at least about 190° C.), to produce a product gas stream of ammonia, carbon dioxide and water vapor for supply to an external use. The process may be operated over a broad range of urea-to-water feed ratios, as in the previous embodiments. The reactor for this system (or, at a minimum, the wetted and/or interior surfaces thereof) preferably is constructed of more corrosion-resistant materials such as HASTELLOY alloy (Haynes International, Inc.); chromium, molybdenum, nickel, niobium, tantalum, titanium, and alloys thereof; and fiberglass-reinforced plastics, instead of, for example, typical alloys of stainless steel. Process controls are adapted to the feed system requirements and otherwise are as described in previous embodiments. The primary advantage of this embodiment is the low operating pressure of the reactor, which enables the design of the reactor and associated equipment to be less robust with respect to pressure. A carrier gas (e.g., warm air) can be used to aid in the injection of the product gas stream into the flue gas stream, for example by increasing the volume and velocity of the product gas stream.

Thus, in an example of a most preferred method of operating according to this embodiment, a 1.0:1.0 weight ratio of urea-to-water is fed to a reactor using molten urea and steam fed separately. The reactor is controlled at a substantially constant temperature in the range 190° C. to 200° C., at which temperature the MAP/DAP catalyst is molten, and a substantially constant pressure in the range 10 psig to below 20 psig. The equilibrium water content of the reaction mixture is in the range 1.0 wt. % to 2.0 wt. %, and ammonia, carbon dioxide and water vapor are produced with rapid reaction kinetics, as in the previously described embodiments.

Non-Catalyzed Urea Hydrolysis—Improved Control Process

Another embodiment of the invention provides an improved process for non-catalyzed hydrolysis of aqueous urea to quantitatively produce ammonia on demand, which maintains the liquid reactants at substantially constant composition and produces a product gas mixture of substantially constant composition, and which includes the steps of: receiving a control signal proportional to the demand rate for ammonia; supplying heat to the reaction mixture in response to the ammonia demand to change the temperature of the reactants and thereby to change the reaction rate; adjusting the pressure of the reactor according to a vapor-liquid equilibrium model with, for example, a pressure control valve, in response to the temperature of the reactants to maintain the product gas composition substantially constant and the discharged water vapor under control; using the liquid level in the reactor to govern the addition rate of urea and process water which are supplied in a substantially constant ratio; whereby the produced gases discharge from the reactor through the pressure control valve for supply to the external use.

Figure 12:
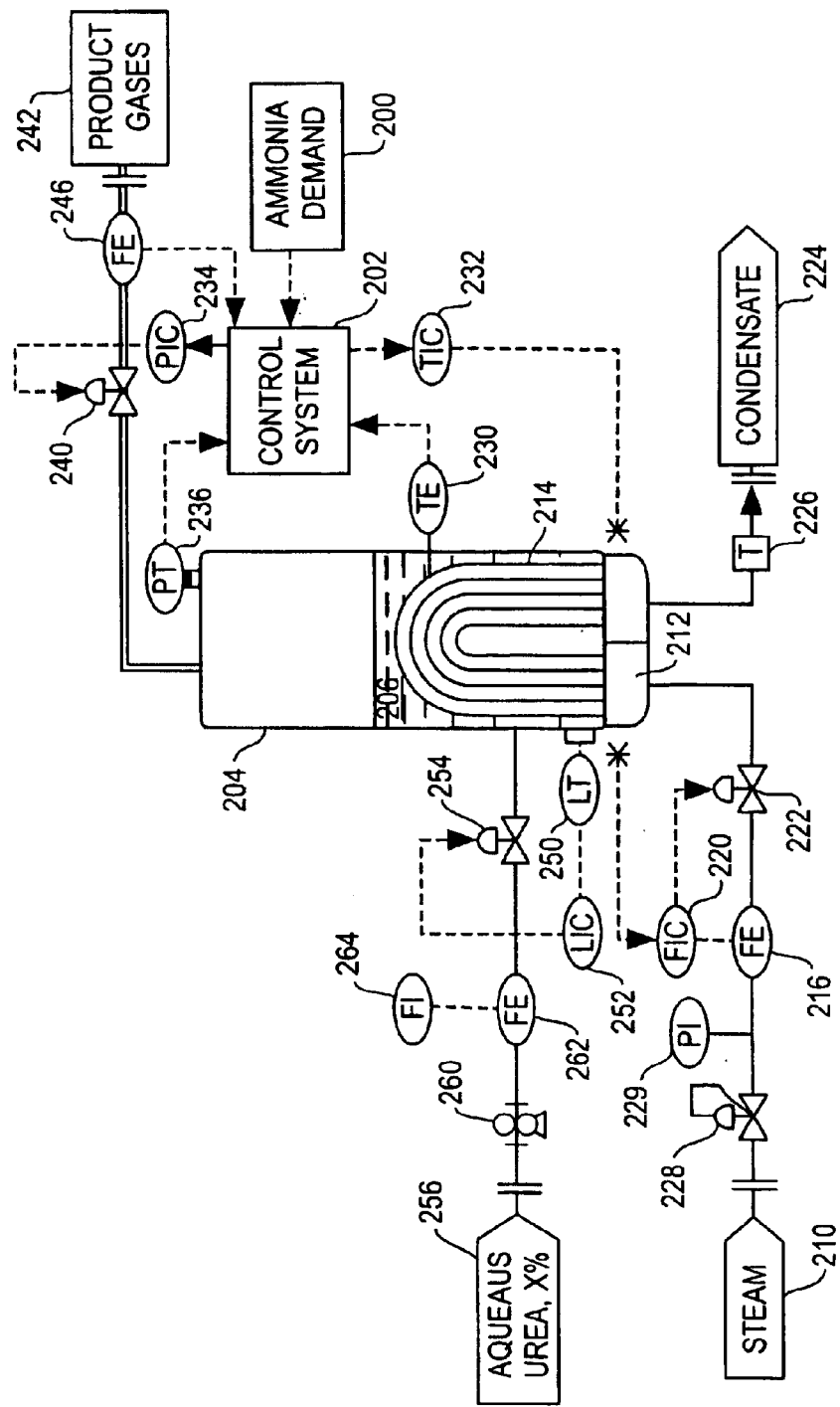
FIG. 12 is a flow diagram of an apparatus according to the invention.

A typical apparatus according to this embodiment, using aqueous urea, is illustrated in FIG. 12. Other feed system variations using molten urea with either water or steam supplied separately may also be employed. In this system an ammonia demand rate signal 200 is connected to a process control system 202, which regulates the urea hydrolysis reaction rate by adjusting the input of heat to a reactor 204 in response to the ammonia demand rate signal 200 to change the temperature of reactants 206. In the illustrated system, heat input is accomplished by controlling the flow of steam 210 to a heater 212 having a steam coil 214 submerged in the reactants 206, using a mass flow sensor 216, a flow controller 220 and a flow control valve 222, and a condensate line 224 is fitted with an appropriate trap 226. For practical purposes, the steam supply can be fitted with a shut off valve 228 and a pressure indicator 229.

The temperature of the reactants 206 is monitored with a sensor 230, such as a thermocouple, which enables the process control system 202 to trim the heat input using a temperature controller 232 and to determine the set point for a pressure controller 234.

A pressure transmitter 236 enables the process control system 202 to monitor the pressure in the reactor 204, and the pressure controller 234 governs a pressure control valve 240, enabling the control of the reactor 204 pressure to be correlated to the temperature of the liquid reaction mixture 206 The process controller 202 applies a known functional relationship to determine an instantaneous set point for the pressure controller 234 in relation to the instant temperature of the reaction mixture 206 to maintain a substantially constant composition in a product gas stream 242.

The mass flow of the product gas 242 is monitored using a flow sensor 246. Since the product gas 242 is maintained at substantially constant composition, the control system 202 can continuously determine the mass rate of production of ammonia and, by manipulating the heat input to the reactor 204, match the ammonia production to the demand rate input by the demand rate signal 200.

A level sensor 250 and a level controller 252, which operates a flow control valve 254, function to maintain a substantially constant volume of reactants 206 in the reactor 204. The mass flow of aqueous urea 256 pumped to the reactor 204 via a pump 260 is monitored by a mass flow sensor 262 and indicated by a flow indicator 264.

Unlike prior art technologies that control the temperature and pressure independently, and in which the concentration of ammonia in the produced gases may vary (especially in response to a change in ammonia demand) an improved hydrolysis control system of the invention, such as in this embodiment, uses the instantaneous operating temperature of the liquid reaction mixture to set and control the instantaneous operating pressure of the reactor. In particular, for a fixed concentration of aqueous urea (or a substantially constant ratio if fed separately) as the process feed stream, and a substantially constant concentration of urea in the reaction mixture, a vapor liquid equilibrium model (or an experimentally derived correlation) relating the operating pressure to the operating temperature is employed in the process control scheme. Examples of theoretical equilibrium lines plotting pressure versus temperature for several different feed compositions are shown in FIG. 1. Thus, the operating pressure is controlled in relation to the temperature of the reactants to maintain the reaction mixture on an equilibrium line for the particular urea feed ratio being used. By controlling the process according to this method, a substantially constant composition is maintained in the reaction solution and the composition of the produced gas mixture is substantially constant, even during changes in ammonia demand.

As discussed previously, non-catalyzed hydrolysis requires much longer reaction time than acid-catalyzed systems, when compared at the same temperature and pressure and when using the same feed ratio of urea and water. Therefore, to achieve the same rate of production of ammonia, the non-catalyzed reactor must contain a great deal more urea than the acid-catalyzed reactor. This has an influence on the best way to bring about a rapid change in ammonia production. In the non-catalyzed system, controlling the reaction rate by changing the aqueous urea feed rate (or separate urea and water/steam feed rates) to bring about a change in the mass (or concentration) of reactants requires a relatively long time (e.g., hours) and is impractical process control scheme in the applications of interest (e.g., deNOx and flue gas conditioning).

However, changing the reaction temperature in the non-catalyzed system, which in turn directly affects the reaction rate constant and thereby changes the reaction rate, is a much more practical means to quickly change the ammonia production rate in response to a change in ammonia demand. Thus, in prior art the process control system regulated the input of heat to the reactor in response to the ammonia demand, which resulted in a controlled change in the temperature of the reactant mixture. This in turn determined the reaction rate constant and the rate of ammonia production. However, the reactor pressure was not controlled in relation to the temperature at all. The improved method according to the invention includes the step of varying the operating pressure in response to the instant operating temperature according to a vapor-liquid equilibrium model (at all times, including during such a change in production rate), which provides the benefit of maintaining the produced gas composition substantially constant and prevents substantial accumulation or depletion of water from the reaction mixture. In addition, when controlling the process by controlling the temperature and pressure at equilibrium values and thereby controlling the composition of the discharged gases, the measured flow of the produced gas correlates directly with the ammonia delivered to the external use, even during a change in production rate in response to a change in demand. The result is improved performance (measured, for example, as the ability to match the instantaneous ammonia production rate to the demand rate), particularly during a changes in ammonia demand.

As in the catalyzed process embodiments, the non-catalyzed process has various embodiments that take advantage of different reactant feed schemes, such as the use of molten urea with a separate supply of liquid process water, or use of molten urea with a separate supply of steam. Unlike the catalyzed process, which operates over a wide range of urea-to-water feed composition, the experimental evidence suggests that a non-catalyzed process may be limited, for practical purposes, to aqueous urea feed concentrations in the range of 40 wt. % to 50 wt. %. This is primarily the result of the energy requirements of the process, which increase as the aqueous solution is diluted because the excess water fed to the reactor must be evaporated to maintain a steady state operation (i.e., prevent accumulation of water). In addition, at concentrations above about 50 wt. %, the aqueous urea feed solution storage must be maintained at temperatures greater than about 20° C. to avoid solubility problems. For example, an equimolar mixture of urea and water at 76 wt. % urea requires a temperature of at least 70° C., and this is not advantageous or convenient. The respective solubility (saturation temperatures) for 40 wt. % and 50 wt. % aqueous urea are 0° C. and 17° C., respectively. The concentration of solids in the reactor is another consideration, since more dilute solutions enhance the rate of reaction at any particular temperature. The most preferred solids content of the reactant solution is in the range of about 35 wt. % to about 60 wt. % (i.e., about 40 wt. % to 65 wt. % water if no catalyst is added). A preferred set of temperature and corresponding pressure ranges for selected feed compositions are illustrated in FIG. 1.

Non-Catalyzed Hydrolysis Using Molten Urea

Another embodiment of the invention is a process for quantitatively converting urea to ammonia on demand in a non-catalyzed urea hydrolysis process with improved energy efficiency, including the steps of: receiving an ammonia demand rate signal; providing a reaction mixture in a reactor vessel containing urea and water; reacting the urea and water in the reaction mixture to produce a gaseous stream including ammonia, carbon dioxide and water vapor; supplying heat to the liquid reaction mixture at a rate in response to the demand rate for ammonia to raise or reduce the temperature of the reaction mixture and thereby change the rate of reaction and production of ammonia to match the demand; monitoring the temperature of the reaction mixture; adjusting the pressure of the reactor in response to the temperature of the reaction mixture by a predetermined functional relationship (experimental or theoretical vapor-liquid equilibrium model) to maintain the composition of the product gas substantially constant; monitoring the liquid level in the reactor vessel and employing this signal in a control system to adjust the feed rate of molten urea and process water supplied to the reactor in a substantially constant mass ratio; whereby the produced gases discharge from the reactor through a pressure control valve into a conduit for supply to the external use.

In this process embodiment it is advantageous to divide the process heat supply means between (a) a heater (e.g., with a heat transfer fluid-filled heating coil) submerged in or in thermal contact with the reactants and (b) the process water supply stream, particularly when in the form of saturated steam at sufficient pressure. To raise the reaction temperature, sufficient heat input is required to satisfy the ongoing, endothermic reaction and the requirement for evaporation of excess water supplied in the feed stream, plus the additional heat needed to raise the temperature of the reaction mixture to increase the rate of reaction. To reduce the reaction temperature, supply of heat by the heater is reduced or interrupted, and supply of molten urea and injected steam (process water) is temporarily reduced or interrupted, enabling the endothermic hydrolysis reaction to cool the reaction mixture, thereby reducing the reaction rate and production of ammonia. (A non-catalyzed molten urea feed process can also be operated at substantially constant temperature and substantially constant pressure, but will not respond as quickly to a change in demand as the preferred embodiment described herein.)

In this configuration, the sensible and latent heat of the condensing steam and the sensible heat of the molten urea feed streams supply a large fraction of the total process heat requirement, the balance being made up by the heat transfer coil. Further, this embodiment may be operated conveniently over a broad range of urea-to-process water feed ratios. Energy efficiency of the process is improved by reduction of the excess process water supplied to the reactor. Since a large portion of the process heat requirement is supplied by the inlet reactants, the supplemental heat transfer device may be smaller. However, with non-catalyzed hydrolysis this may not enable a significant reduction in the volume of reactants or the size of the reactor itself, since a relatively large amount of urea is required to achieve the desired ammonia production. In such a system operating with a mass ratio of urea to water of 1:1 (corresponding to 50 wt. % aqueous urea), and in which the water is supplied as steam injected at the pressure of the reactor, about 65% of the process heat is supplied by the reactant streams. Thus, the supplemental heat duty is reduced to about 35% of the total. The heat transfer coil is therefore much smaller, and the reactor cost may be correspondingly reduced. A preferred set of temperature and corresponding pressure ranges for selected feed compositions are illustrated in FIG. 1.

Further Process Improvements

Disproportionate Feeding of Urea

An aspect of the invention, particularly advantageous for acid-catalyzed embodiments adapted for supply of urea and process water as separate streams, is a control scheme for minimization of the transient response time following a change in ammonia demand. Thus, in acid-catalyzed embodiments it is beneficial to operate the reactor at a constant temperature and pressure, for reasons that have been described previously. To illustrate the method, it is important to consider the case of a sudden increase and also the case of a sudden decrease in ammonia demand.

Figure 13A:
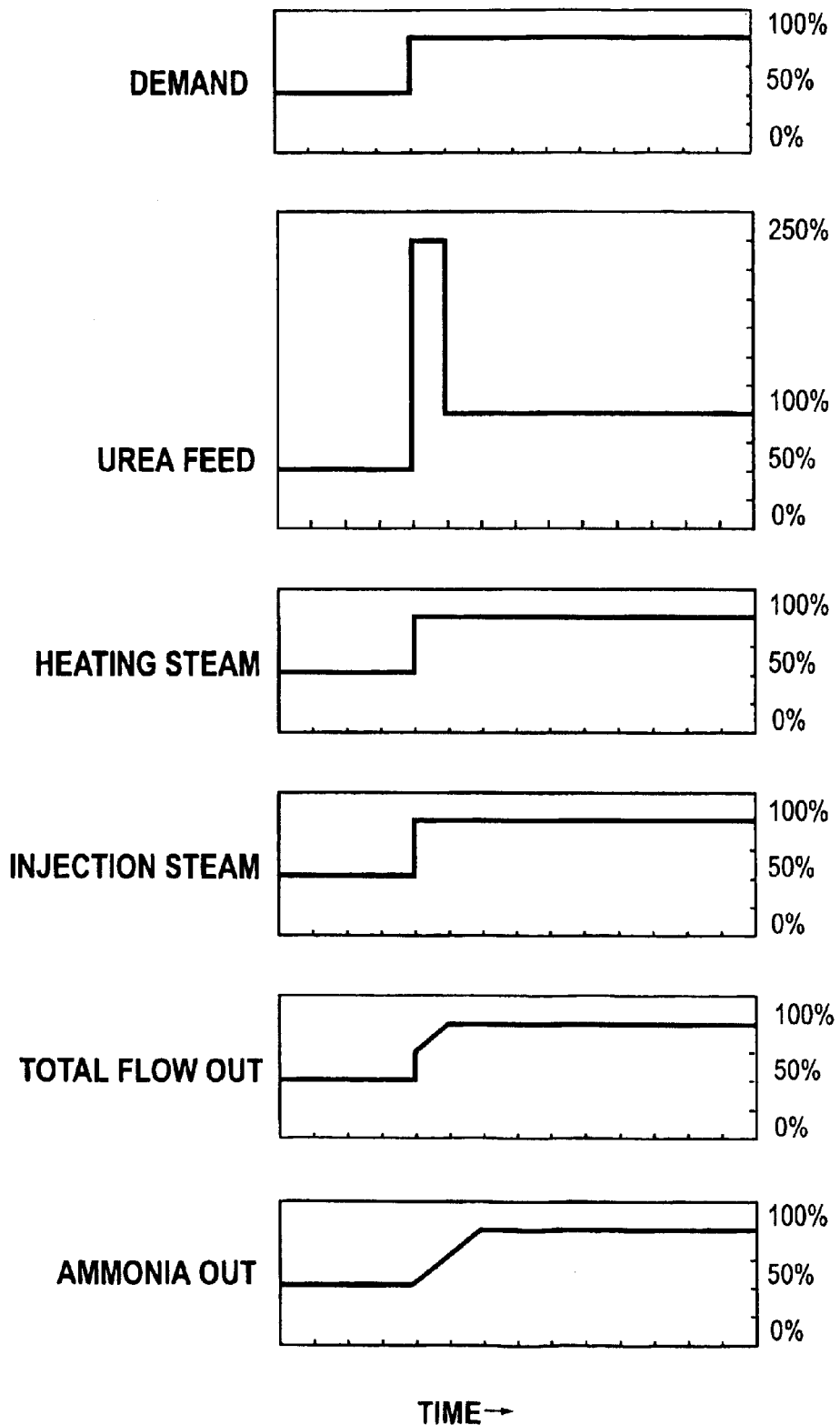
FIGS. 13a and 13b are illustrations of the transient response during a sudden increase and sudden decrease in demand, respectively, for an embodiment of a process according to the invention.

When the ammonia demand changes, for example in a step increase to double the initial ammonia production rate, then a predictable new equilibrium condition will be required, characterized by the following conditions: the urea feed rate will be double the initial rate, the process water supply rate will be double the initial rate, heat input to the reactor will be double the initial rate, the mass of urea in the reactor at equilibrium will be double the initial amount, and the temperature and pressure of the reactor will remain unchanged. Therefore, if the amount of urea present in the reactor is known prior to the change, then the transient response time may be minimized by supplying urea to the reactor at the maximum possible rate until the required mass of urea is added (e.g., double the initial amount, in this example), then reducing the urea flow from the maximum to the new feed rate, thus bringing about the fastest feasible change in the mass of urea present in the reactor. During the period of maximum urea supply, the process water supply rate and the heat input to the reactor are stepped up to the new steady state supply rates.

Where the production rate is doubled, this method minimizes the time required to double the mass of urea in the reactor, which is essential for the new equilibrium condition. By operating in this manner, the ammonia production will reach the new production rate in the least amount of elapsed time. Thus it is advantageous to equip the process system with a urea supply means with sufficient capacity to rapidly feed a quantity of urea into the reactor. The control method of this example is illustrated further in FIG. 13a, which illustrates an increase in ammonia production from 50% to 100% capacity. The illustration shows the urea feed rate temporarily increasing to 250% (value representing a hypothetical maximum feed rate) until the new quantity of urea is present in the reactor. Measuring the urea mass flow and calculating the accumulation enables the time required to be determined until a target quantity has been added.

When the ammonia demand drops, for example to half the current production rate, then similarly a predictable new equilibrium condition will be required, characterized by the following conditions: the urea feed rate will be half the initial rate, the process water supply rate will be half the initial rate, heat input to the reactor will be approximately half the initial rate, the mass of urea in the reactor at equilibrium will be half the initial amount, and the temperature and pressure of the reactor will remain unchanged. Therefore, if the amount of urea present in the reactor is known prior to the change, then the transient response time may be minimized by interrupting (e.g., halting) supply of urea until the mass of urea in the reactor has fallen (consumed by the on-going reaction) to the new requirement, then setting the urea flow to the new feed rate, thus bringing about a fast change in the mass of urea present in the reactor.

Figure 13B:
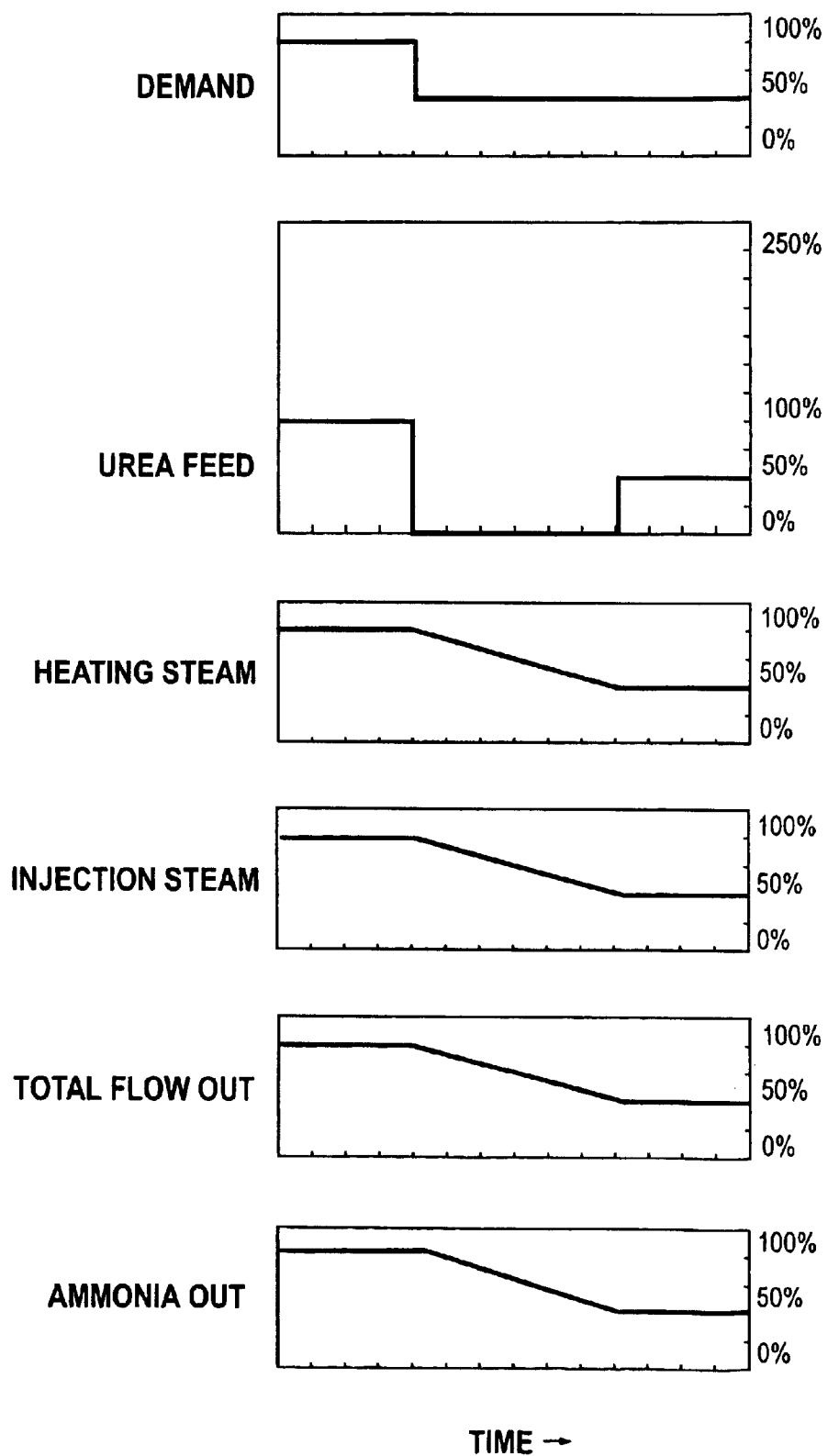

During the period of interrupted urea supply, the process water supply rate and the heat input to the reactor are ramped down to the new steady state supply rates. A "ramp down" algorithm for reduction of the water supply and heat input to the reactor from the initial to the final rates may be programmed based on, for example, a linear function of elapsed time or proportional to a calculated instant urea content. In the present example (halving the ammonia production rate), this control method minimizes the time required to halve the mass of urea in the reactor, which is essential for the new equilibrium condition. By operating in this manner the ammonia production will reach the new production rate in the least amount of elapsed time. The control method of this example is illustrated further in FIG. 13b, which illustrates a decrease in ammonia production from 100% to 50% capacity. Thus, the urea supply is shut off for a controlled period of time, during which the urea present in the reactor continues to react. Based on the known reaction rate, the urea depletion rate can be predicted, and the time required can thus be determined. The illustration shows process water (e.g., injection steam) and heat input to the reactor (e.g., heating steam) ramping down linearly with time.

Other Sensors

An aspect of the invention that may be adapted to all of the processes of the invention and the embodiments illustrated in FIGS. 9 to 12 employs mass flow sensors to precisely measure the mass flow rate of all feed and product streams. These devices enable continuous, real-time monitoring of the material balance around the hydrolysis reactor, and may be employed in a control scheme to adjust the set point of process controls in various ways to enhance the process control or even replace other control devices. For example, the difference between the total mass discharged from and total mass fed to the reactor provides a measurement directly reflecting the steady state mass balance. This can be used to trim the operating temperature or pressure (or urea and water feed(s)) to enhance the performance of the process control system. For example, mass flow sensors can be used in the disproportionate feeding improvement described above to monitor the material balance when increasing or decreasing the flow rate of urea to the reactor to maintain a substantially constant mass of liquid reactants.

Another aspect of the invention includes use of analytical sensors, such as a pH monitor. In an acid-catalyzed process according to the invention, for example, the pH of the reaction mixture provides a measurement that directly correlates to the ratio of ammonium salts including the catalyst, for example MAP:DAP, present in the reaction mixture. Use of such a sensor will enable operation of the reactor at conditions that provide beneficial performance, such as enhanced reaction efficiency, reduced corrosion rate, or other such benefits.

Preferably, reactants are fed at a substantially constant ratio of urea to water regardless of ammonia demand, but this need not be the case. Thus, for example, the concentration of urea in the feed can be increased in response to an increase in ammonia demand rate. In one embodiment of the invention, this can be accomplished by dissolving solid urea in water to a known and relatively high concentration, storing the concentrated aqueous solution, and diluting it to various concentrations when withdrawn for feeding to a reactor vessel. In another embodiment of the invention wherein urea (in the form of solid or molten urea) and process water (in the form of liquid water or steam) are introduced into the reactor as separate feed streams, the urea and water feed rates can be increased or decreased relative to one another to provide the desired ratio of urea to water.

The hydrolysis reactor vessel and all wetted components in either MAP/DAP catalyzed or non-catalyzed embodiments can be constructed of a material such as 316 series stainless steel, as long as the operating temperature is maintained below about 175° C., preferably below about 170° C. In this range, the corrosion rate begins to increase and would generally be unacceptable at temperatures greater than 175° C. If operating at temperatures above 175° C. is required, especially for MAP/DAP-catalyzed hydrolysis, then the reactor preferably is constructed of more corrosion-resistant materials such as HASTELLOY alloy or an alloy with higher molybdenum content. Otherwise, the apparatus and process controls described above can be adapted to this operating temperature.

In the preferred operating ranges of a MAP/DAP-catalyzed process according to the invention, the concentration of urea in the reaction mixture is quite small, typically from about 1 wt. % to about 6 wt. %, whereas the concentration of catalyst is about 55 wt. % to about 80 wt. %.

Variations on Feeding Urea and Water

In a process according to the invention, the feeding step can include: feeding an aqueous solution including urea and water; feeding molten urea and steam; feeding solid urea and steam; feeding molten urea and water; and feeding solid urea and water. Feeding an aqueous solution including urea and water has the advantage that the solution can be prepared with a known concentration of urea. One drawback of the use of aqueous urea as a reactant feed stream is that solutions of a concentration that can be maintained at room temperature (e.g., up to about 50 wt. % urea) contain far more water than is necessary for the hydrolysis reaction. Consequently, the water must be evaporated from the reactor, which requires significant additional energy consumption by the process. Otherwise, storing highly concentrated aqueous urea (e.g., greater than 50 wt. %) would require heating the entire storage system (e.g., reservoir and related equipment) to a temperature above the saturation temperature at the given concentration to prevent precipitation of solid urea.

Molten or Solid Urea Systems

A process of the invention wherein molten urea and steam are fed to the reactor is preferred, and has several advantages which have been described above. Optionally, solid urea can be fed directly to the reactor (e.g., by a single screw feeder (pressurized) or by a twin screw extruder) with a separate steam feed, which also makes possible several advantages. A dry air purge can be used to keep the pressure of the screw feeder in excess of the reactor operating pressure, which would prevent the reactants from flowing out of the reactor into the urea feeder. Using solid urea, the flow rate of urea into the reactor can be measured by using a weight loss metering device to the screw feeder, for example.

Preferably, when molten urea is used in a process according to the invention, a low-volume melter is used, and the melter has a residence time preferably of about 30 minutes or less and a temperature preferably of about 135° C. to about 150° C., to minimize decomposition and/or polymerization of urea. Urea melts at 133° C., where it immediately begins to decompose and sublimate at a rate proportional to the temperature, up to about 168° C., where it rapidly decomposes. Likewise, when molten urea is used in a process according to the invention, stored solid urea preferably is maintained in a low-humidity environment to prevent agglomeration of urea prills and to minimize urea hydrolysis upon melting. Urea hydrolysis in a urea melter can present the additional problem of making pumping difficult because the vapor production makes it difficult to keep the pump primed. Preferably, a pump and piping system used for conveying molten urea will be designed or selected to eliminate or minimize pockets where vapor can accumulate.

When molten urea is used in a process according to the invention, preferably any vapors (primarily ammonia) given off by the urea melter are collected and combined with the ammonia-containing reactor product stream or a dilution air stream for feeding to the process that requires ammonia, such as a nitrogen oxides removal or flue gas conditioning process. The vapors alternatively can be sent to an ammonia scrubber unit prior to discharge to the atmosphere.

In an embodiment of the invention wherein the equilibrium temperature and pressure are controlled to constant values, a change in ammonia demand requires that the total heat input be controlled in direct proportion to the urea feed rate. Therefore, the amount of heat supplied to the reactor is changed in direct proportion to the urea feed rate in response to a change in ammonia demand. This will result in the process temperature remaining substantially constant during a transient period after a change in ammonia demand, and when full equilibrium at the new production rate is achieved, the temperature will be the same as before the change. When a constant temperature is desired, a trim control can be provided in addition to the primary proportional control. Thus, a direct measurement of the temperature of the liquid reaction mixture, for example, can be used in a trim control that works in conjunction with the proportional control to assist in fine-tuning to a substantially constant temperature.

During the urea hydrolysis process, with or without a catalyst, the evolution of gases from the reaction mixture can create a foam on the surface of the reaction mixture. Preferably, the foam is minimized to keep all reactants (and catalyst, if used) in the reaction mixture and to minimize the potential for formation of undesirable products in the reactor via side reactions and to prevent entrainment of solids in the gaseous product stream.

Foam can be reduced by several different methods, such as agitating the reactants in the reactor, for example by a mechanical device such as a stirrer, and by injecting steam directly into the reactor. A defoaming agent such as DOW CORNING brand Antifoam 1510-US can also be added to the reactants prior to feeding into the reactor or to the reaction mixture. The formation of foam can be reduced by selecting process conditions wherein the reaction mixture contains a relatively high concentration of water, for example about 20 wt. % to about 60 wt. %. Using a smaller volume of catalyst, especially when a MAP/DAP catalyst mixture is used, can also reduce the formation of foam. Using less catalyst also provides relatively more volume in a reactor of fixed size, which reduces the probability of foam being entrained in the product gas stream.

The reactor can be designed to reduce the probability of reactants (and catalyst, if used) being entrained in the product gas stream. For example, the reactor can be designed to provide a large liquid surface area for vapor disengagement, and to lower the vapor velocity. The path length from the surface of the liquid reaction mixture can be maximized to minimize the probability of reactants (and catalyst, if used) being entrained in the product gas stream. Additional apparatus can be installed inside the reactor to promote vapor disengagement, such as a mist filter or mesh pad in the gas flow path, or a centrifugal degasser, preferably in the vicinity of the vapor outlet from the reactor.

A catalyst can optionally, but preferably, be used in a process according to the invention. A polyprotic acid catalyst is preferred, particularly a polyprotic mineral acid catalyst, more particularly a mono- and/or di-ammonium salt of a polyprotic mineral acid, such as MAP and/or a mixture of MAP and DAP. The MAP and/or DAP can be charged to the reactor as dry crystals prior to startup, or can be generated in-situ by charging the reactor with phosphoric acid prior to startup. Preferably, a mixture of MAP and DAP is charged to the reactor as dry crystals prior to startup to prevent corrosion of the reactor by phosphoric acid.

Urea hydrolysis according to the invention using a MAP/DAP catalyst mixture preferably is carried out with a large excess of catalyst. The molecular weight of urea is 60, MAP is 115, and DAP is 132. Thus, to have an equimolar amount of MAP/DAP catalyst requires approximately 1.92 to 2.2 times the mass of the urea in the reaction mixture. However, to ensure an excess of catalyst, the weight of catalyst in the reaction mixture preferably is in a range of about 2.5:1 to about 50:1 ratio (theoretically without upper limit) with the urea content on a mass basis, and more preferably in a range of about 2.5:1 to about 20:1 ratio.

Another aspect of the invention is an apparatus for quantitatively converting urea to ammonia on demand. The apparatus will include at least an ammonia demand signal receiver, a reactor, a urea feeder, a valve for controlling the reactor pressure and release of product gases, and a heater. Preferably an apparatus according to the invention will include a combination of the various elements described above, such as a heater, a direct steam injection feeder, pressure and temperature monitors, an agitator, a degasser, a urea melter, a reaction mixture sampling valve, gas and liquid flow meters, pumps, metering devices, control devices (e.g., proportional, integer, etc.), and safety devices such as an emergency pressure relief valve. Preferably, an apparatus according to the invention will connect the various elements described above according to a combination of relationships described above, such as a urea feeder that is responsive to an ammonia demand signal. In one embodiment of the invention, the urea feeder can also serve as a water feeder, such as when aqueous urea is used as a reactant feed stream. In another embodiment of the invention, a separate water (steam) feeder is present in addition to the urea feeder.

Thus, one embodiment of an apparatus according to the invention, includes an ammonia demand signal receiver; a reactor vessel adapted to contain reactants including urea and water at elevated temperature and pressure and to release a gaseous product stream including water, carbon dioxide, and ammonia; a feeder responsive to the demand signal for feeding urea to the reactor; a heater responsive to the demand signal for heating the reactants to elevated temperature; and a valve in fluid communication with the reactor for maintaining the reactants at a substantially constant elevated pressure.

Examples of flow diagrams for apparatus according to the invention are depicted in FIGS. 9 to 12, which have been described above. In an apparatus according to the invention the heater preferably is adapted for heating the reactants to a substantially constant elevated temperature. An apparatus according to the invention also preferably includes a defoaming or demisting apparatus, such as a degasser, a mist filter, or a mesh pad. An apparatus according to the invention also preferably includes a urea melter and a steam feeder responsive to the demand signal.

Contaminant Removal

In a process disclosed herein, one or more contaminants (e.g., from urea feed or formed in the reactor) may accumulate, and preferably are removed continuously or intermittently, for example according to the methods and apparatus disclosed in co-pending U.S. application Ser. No. 09/708,897 filed Nov. 8, 2000, which is incorporated herein by reference.

EXAMPLES

The following examples are provided to illustrate the invention but are not intended to limit the scope of the invention.

Example 1

In this example, 50 wt. % aqueous urea was employed as the form of the liquefied urea and, as a consequence, sufficient process water was supplied to the reactor as part of the aqueous stream.

The apparatus used included a process control system that received a signal proportional to an instant demand signal for ammonia in an external process, and employed the demand signal to set the flow rate of urea solution to the reactor in direct proportion to the demand signal. The aqueous urea feeder was a process pump capable of continuous delivery of aqueous urea at a pressure greater than the operating pressure of the reactor (about 150 psig). The discharge capacity of the urea feed pump was oversized to enable a continuous circulation of the excess portion back to an aqueous urea storage reservoir, while a side stream was continuously metered by mass flow into a urea hydrolysis reactor (316 stainless steel construction) at a rate stoichiometrically equivalent to the ammonia demand.

In the test apparatus, a flow sensor (for example, mass flow by Coriolis force) was used in combination with a flow controller and mass flow control valve to govern the urea flow rate to the reactor inlet at a rate directly proportional to the instant demand signal. The process controller was programmed to use the instant measured mass flow rate and predetermined concentration of the urea feed solution to calculate the instant quantity of urea flowing to the reactor. The rate of heat input to the reactor was supplied in direct proportion to the flow rate of urea to the reactor. Thus the rate of heat input was automatically adjusted to supply the combined instant heat of reaction plus the heat required to evaporate excess water and thereby maintain the reactor at a substantially constant operating temperature.

The operating pressure of the reactor was maintained substantially constant by means of a pressure control valve placed in the discharge gas line and operated by means of a standard pressure control loop. The pressure control valve was normally closed and was operated in response to the reactor pressure, opening to release the produced gases once the set point pressure was attained. A$^+$ steady state, the mass flow of gaseous product leaving the reactor was equal to the mass flow of reactants supplied to the reactor. When the concentration of the inlet urea solution was constant, the concentration of the ammonia in the product gas stream was substantially constant, and independent of the ammonia production rate.

At steady state, the composition of the liquid reaction mixture reaches a full chemical equilibrium, characterized by a particular ratio of MAP to DAP at constant temperature, and was measured as 20.85 wt. % MAP, 56.22 wt. % DAP, 1.90 wt. % un-reacted urea, and 19.70 wt. % water, based on laboratory analyses. The amount of catalyst mass was fixed at 160 kg, and the amount of urea that was present in the liquid reaction mixture varied in relation to the production rate. The actual value of the urea concentration depended on the quantity of catalyst mass (MAP plus DAP) present in the reactor. The reaction rate constant was independent of ammonia production rate, because the temperature and pressure were substantially constant. The reaction rate varied in response to the variation in steady state urea concentration. To double the ammonia production, the amount of urea in the reaction mixture must double. Given the fast reaction kinetics and fast response of the process controls, equilibration and approach to a new steady state condition after a rate change occur quickly.

Figure 14:
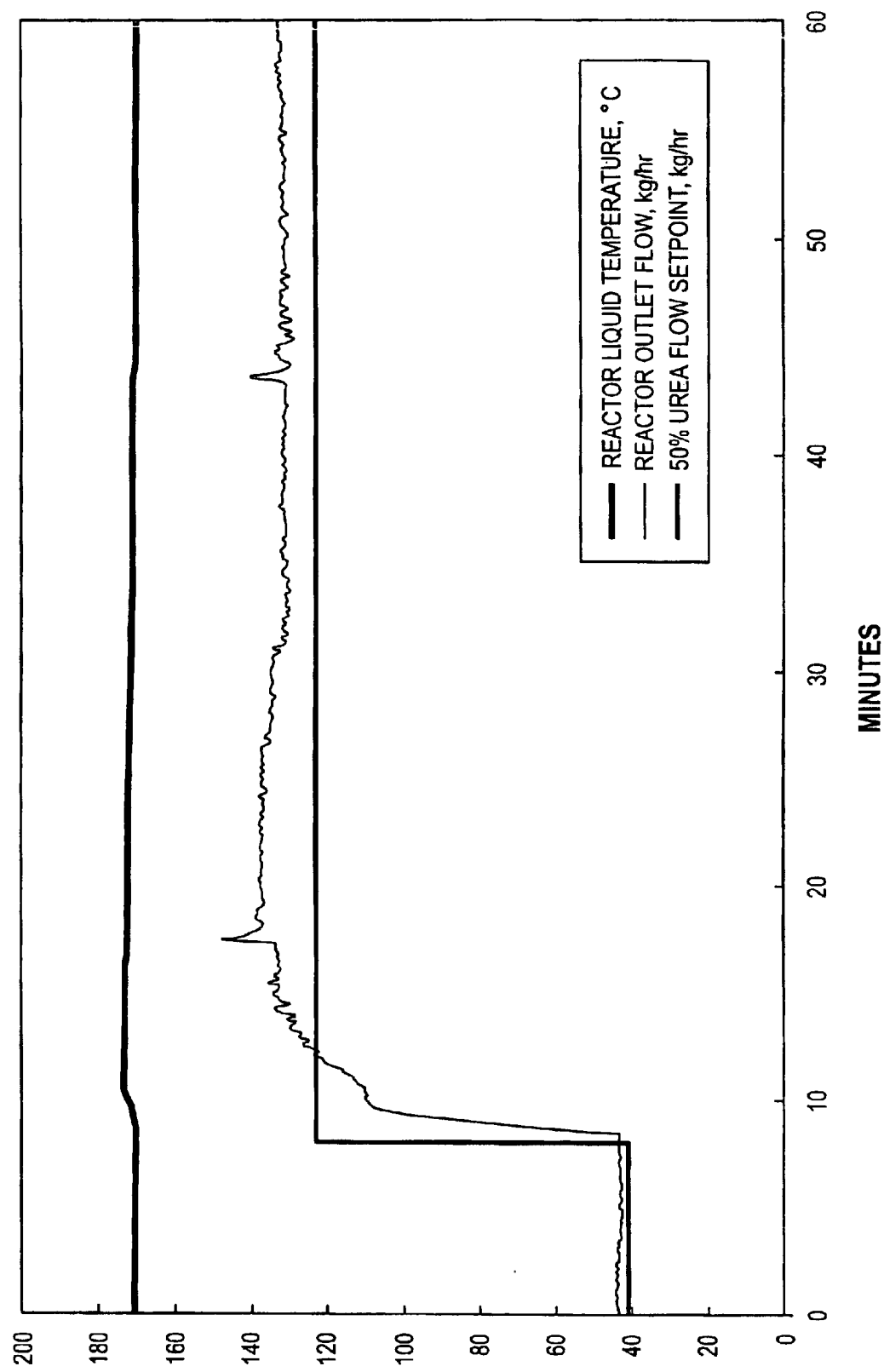
FIG. 14 depicts recorded transient response data for a urea hydrolysis process with aqueous urea feed according to the invention undergoing a step change in demand.

FIG. 14 depicts the recorded transient response data for this example at a sampling interval of six samples per minute. The figure shows the process initially operating at steady state with a set point for 50 wt. % aqueous urea flow rate to the reactor of about 41 kg/hr, and the transient response following a step change in the aqueous urea flow rate to 124 kg/hr. As FIG. 14 shows, the temperature was substantially constant at about 170° C. throughout the change. The pressure (not shown) was also substantially constant during the run at 120 psig. The line marked "reactor outlet flow" depicts the mass flow of product gases and water vapor leaving the reactor. The product gas flow rate began to increase immediately, and reached about 75% of the new steady state requirement within about two minutes. Within 12 to 15 minutes, the system reached steady state at the new production rate. FIG. 14 compares the aqueous urea mass flow rate set point with the measured reactor outlet mass flow, which should be equal at steady state. The mass flow sensor on the product gas flow, though quite sensitive, was used in a range in this experiment where it tended to read a high value (calibration error), as reflected in FIG. 14, but the rapid leveling of the measured flow illustrates the equilibration.

Example 2

In this example, pure molten urea was employed as the liquefied urea, and as a consequence, process water was supplied to the reactor as a controlled flow of saturated steam. It was calculated that the latent heat of a portion of the steam that condensed contributed about 60% to 70% of the total heat requirement for the process. The balance of the required heat was supplied in this experiment by a steam-supplied heating coil submerged in the liquid reactants.

The apparatus in this experiment was essentially the same as in FIG. 11: solid granular urea was dropped in small batches from a bulk handling system into a hopper of a feeder device (speed-controlled screw feeder) to meter the granular urea at a controlled rate into a melter vessel. The speed of the screw feeder was adjusted in response to the liquid level of molten urea inside the melter using a conventional level control process loop. The melter was designed to minimize the residence time of the molten urea (about 30 minutes or less) and the heating temperature in the melter (slightly above the melting point of urea, about 146° C. to about 152° C.) and to enable plug flow of the molten urea, so that formation of urea decomposition by-products was minimized.

In response to an external demand for ammonia, molten urea was fed at a directly proportional rate to the demand by a jacketed pump with a mass flow sensor and a flow control valve. Any excess flow was returned to the melter to maintain an active circulation and to melt incoming urea. Contaminant-free 200 psig saturated steam was used as process and utility steam, since the reactor was operated at 120 psig and the flow controls resulted in a small pressure loss. A portion of the steam was regulated down to a pressure in the range of about 48 psig to about 58 psig for use in the melter heating jacket and for tracing the molten urea supply equipment and piping. Separate steam pressure regulation for use in the melter jacket and the supply system tracing was provided to enable some adjustment of supply pressure. Insulation losses and heat input from the metering pump affected the optimum adjustment in the desired range of pressure. The flows of steam used for injection as a process water source and for use in the heating coil were supplied through individual mass flow sensors and flow control valves. The set points for these flow control loops were determined in response to the urea supply rate to the reactor.

Figure 15:
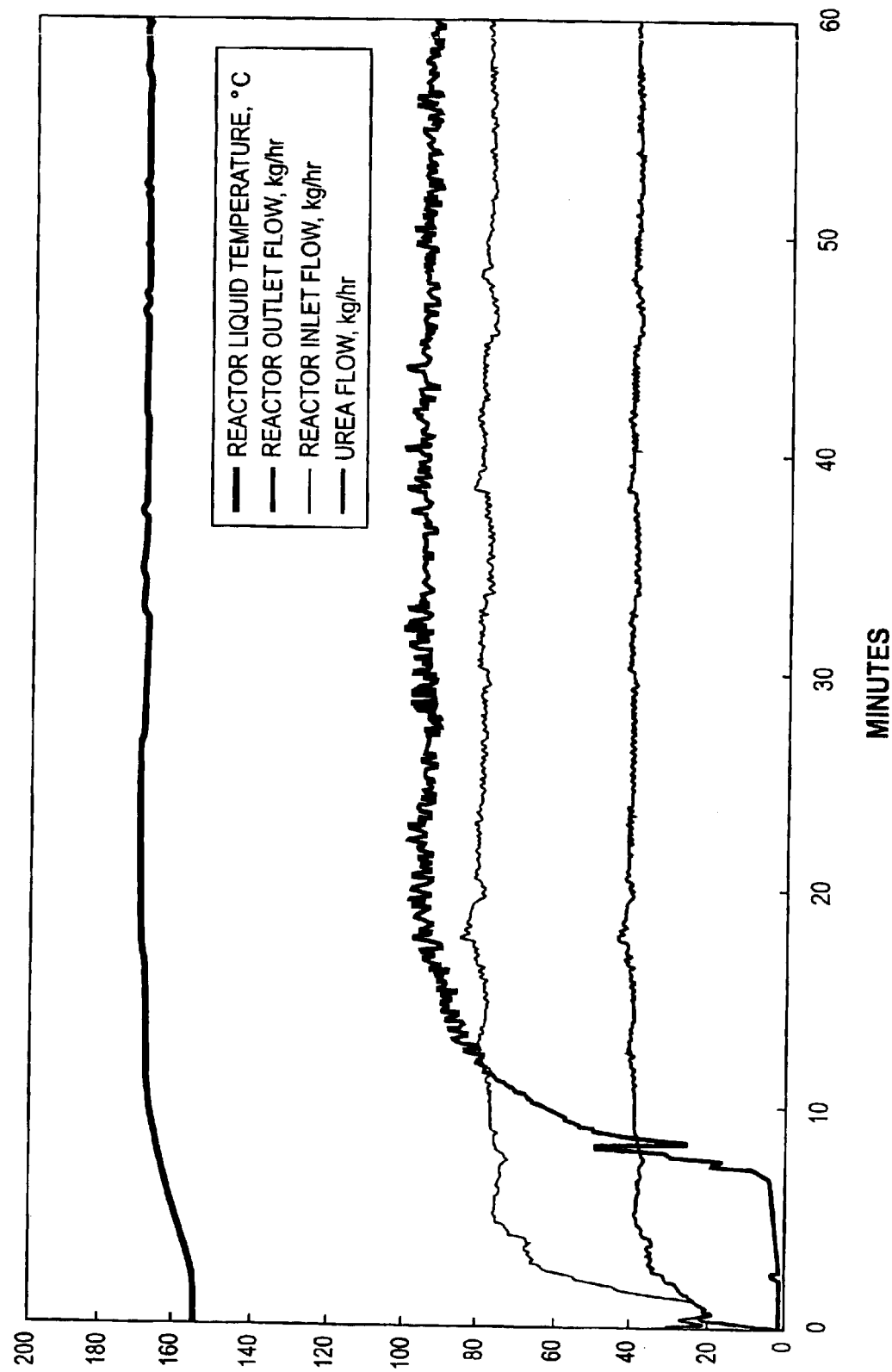
FIG. 15 depicts recorded transient response data for a urea hydrolysis process with molten urea feed according to the invention during a system start up.

FIG. 15 depicts data recorded during a system start up, setting the desired reactor conditions at constant 170° C. and constant 120 psig. The figure shows the urea flow rate, the total reactants (urea plus process water) inlet flow rate, the reactor outlet mass flow rate, and the reactor liquid temperature versus the elapsed time. At time zero, the flows of urea, injection steam, and supplemental heat were started. Prior to startup, a charged mixture of catalyst was preheated to about 155° C. The process reached the desired temperature (170° C.) in about 12 minutes to 15 minutes and remained steady thereafter. The urea and process steam injected to the reactor increased to their respective set points in a series of step adjustments over this 12 to 15 minute period. The initial reactor outlet gas flow remained essentially zero as pressure in the reactor built up to 120 psig, and then produced gas began to be detected in the outlet line and rapidly increased at about seven minutes. The reactor outlet gas flow rate achieved about 75% of the desired steady state flow rate at about 10 minutes to 12 minutes, and reached the full steady state production rate at about 20 minutes after startup (change in ammonia demand).

Figure 16:
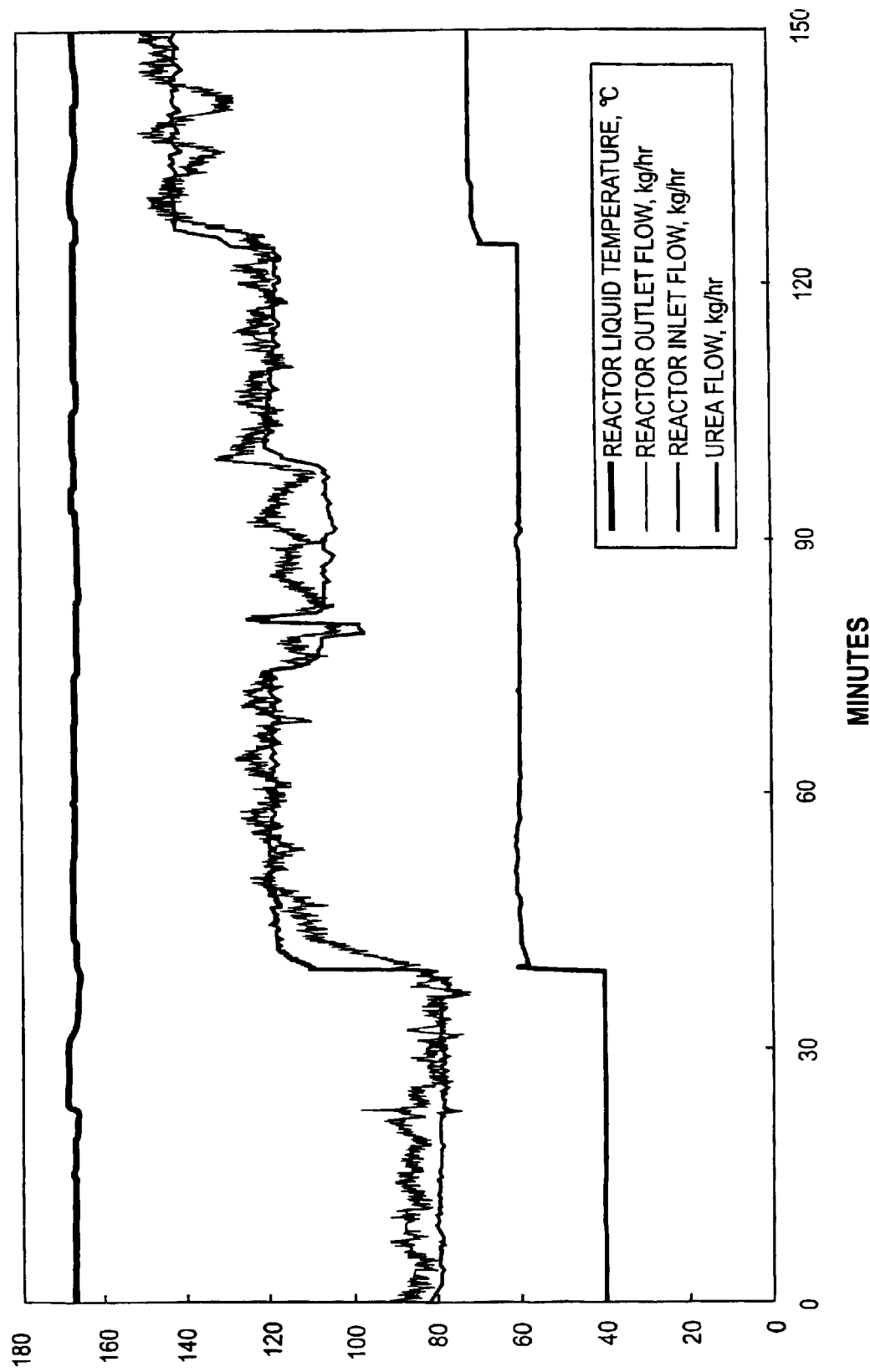
FIG. 16 depicts recorded transient response data for a urea hydrolysis process with molten urea feed according to the invention during several changes in urea and steam injection flow rates.

FIG. 16 depicts data recorded during an experiment operating with molten urea at 170° C. and 120 psig, and shows the transient response to several changes in urea and steam injection flow rates. The apparatus employed is illustrated in FIG. 11 (configured for a small volume of reactants. In this case the mass of catalyst used was 60 kg. The same four variables as in FIG. 15 are plotted versus elapsed time. The operating temperature remained substantially constant at 170° C., and the inlet urea flow initially was 40 kg/hr, then was increased to 60 kg/hr, and then was increased again to 70 kg/hr. The line depicted for the reactor inlet flow is the sum of the urea flow and the injected steam flow, and this total inlet flow shown for comparison with the reactor outlet mass flow. At about 40 minutes, the urea and steam injection flows were increased for the first time, and the transient response required about 12 minutes to about 15 minutes. At about 75 minutes, the injection steam flow rate was deliberately reduced while maintaining a substantially constant urea flow rate, and again the process reacted quickly to this change. Then, at about 100 minutes, the injection steam flow rate was returned to the former value, and the apparatus and process control system reacted to this adjustment, coming back to the former operating conditions. Finally, the urea flow and steam injection flow rates were increased again to the highest rate, and the ammonia production rate followed this change. The transient response is shown to begin immediately and to follow the variation in the urea supply in either direction, and achieve a new full steady state in about 12 minutes to 15 minutes at these reactor conditions.

Example 3

The apparatus of Example 1 was employed to investigate the reaction kinetics of urea hydrolysis in a non-catalyzed liquid reaction mixture. A series of experiments were performed using 40 wt. % aqueous urea as a feed. The object of the experiments were to establish a steady state condition, operating the reactor at a selected constant temperature and at a pressure determined from vapor-liquid equilibrium calculations using a combination of Raoult's Law and Dalton's Law. The intent was to maintain the concentration of reactants in the reactor constant, while simultaneously avoiding any loss or accumulation of mass. Therefore, the excess water supplied in the feed solution will be discharged from the reactor along with the produced ammonia and carbon dioxide. When the reaction process is controlled in this manner, the system is at a steady state and full chemical equilibrium, and the reaction rate constant can be determined accurately. The object of the experiment was to determine the reaction rate constant k so that the kinetics of the non-catalyzed hydrolysis can be compared to the process using the phosphate catalyst.

In the series experiments tabulated below, a reactor was charged with a carefully measured mass of urea and process water so that the starting concentration of urea and the total starting mass of urea present in the reactor were known. The urea concentration was set near the 40 wt. % of the feed urea used in these reactions. An operating temperature was arbitrarily chosen for each experiment. FIG. 1 was generated from vapor-liquid equilibrium calculations using Roault's Law and Dalton's Law, and enables a predicted operating pressure to be selected from the selected operating temperature to maintain constant composition and total mass in the liquid reaction mixture. Results are summarized in Table 2, below.

TABLE 2

Non-catalyzed Reaction Rate Constant vs. Temperature

| Temp (° C.) | Pressure (psig) | 1/T | k (min-1) | 1/k (min) | ln(k) |
|---|---|---|---|---|---|
| 149 | 80 | 2.37E-03 | 0.0051 | 196.1 | −5.28 |
| 153 | 100 | 2.35E-03 | 0.0065 | 153.8 | −5.04 |
| 160 | 118 | 2.31E-03 | 0.0095 | 105 | −4.66 |
| * 163 | 126 | 2.29E-03 | 0.0111 | 90.0 | −4.50 |
| * 171 | 158 | 2.25E-03 | 0.0165 | 60.34 | −4.10 |

Figure 2:
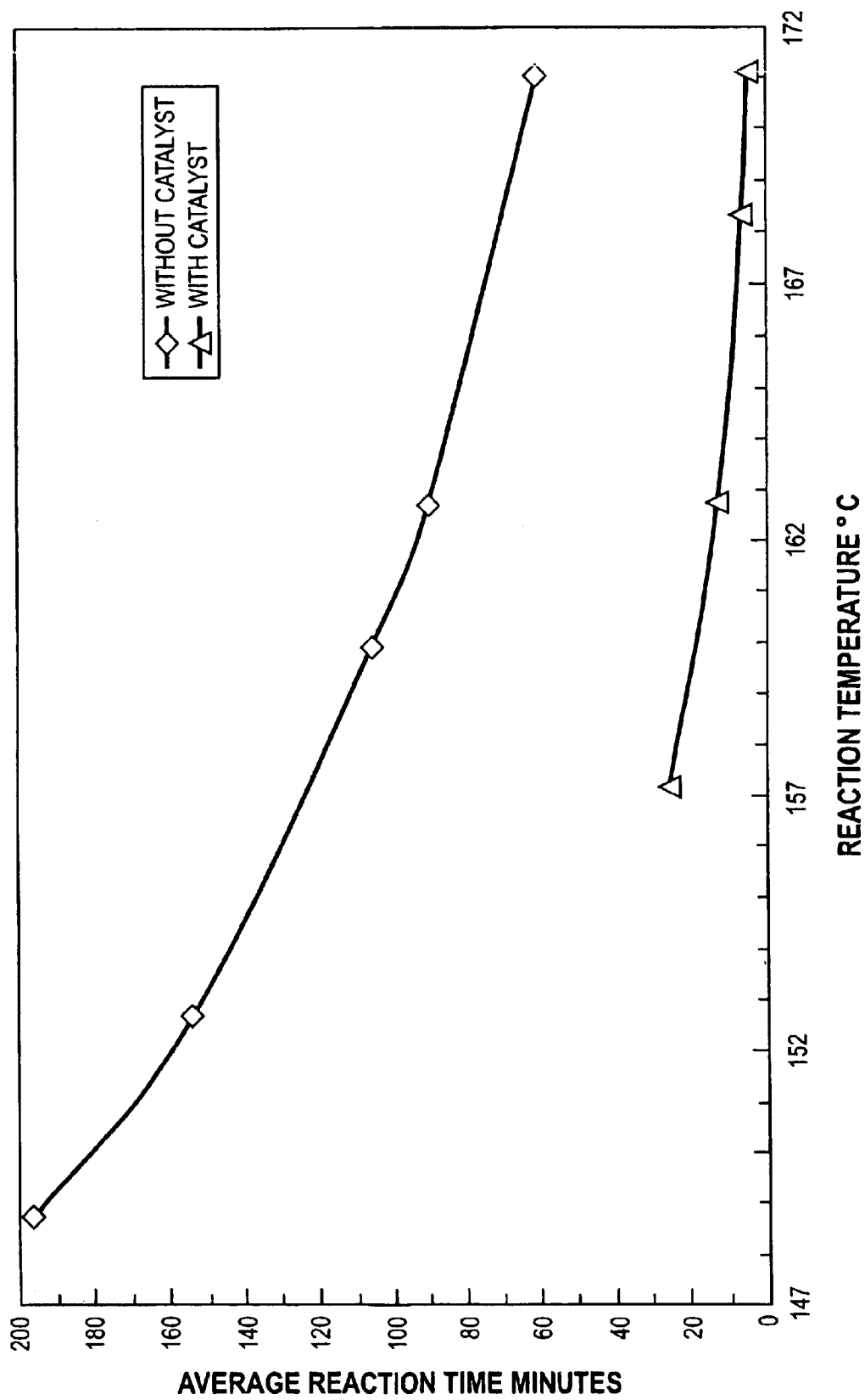
FIG. 2 is a plot of average reaction time (minutes) versus reaction temperature (degrees Celsius) for various measured reaction temperatures in steady-state, equilibrium condition, catalyzed and non-catalyzed, urea hydrolysis processes and for two extrapolated values of non-catalyzed reactions.
Figure 3:
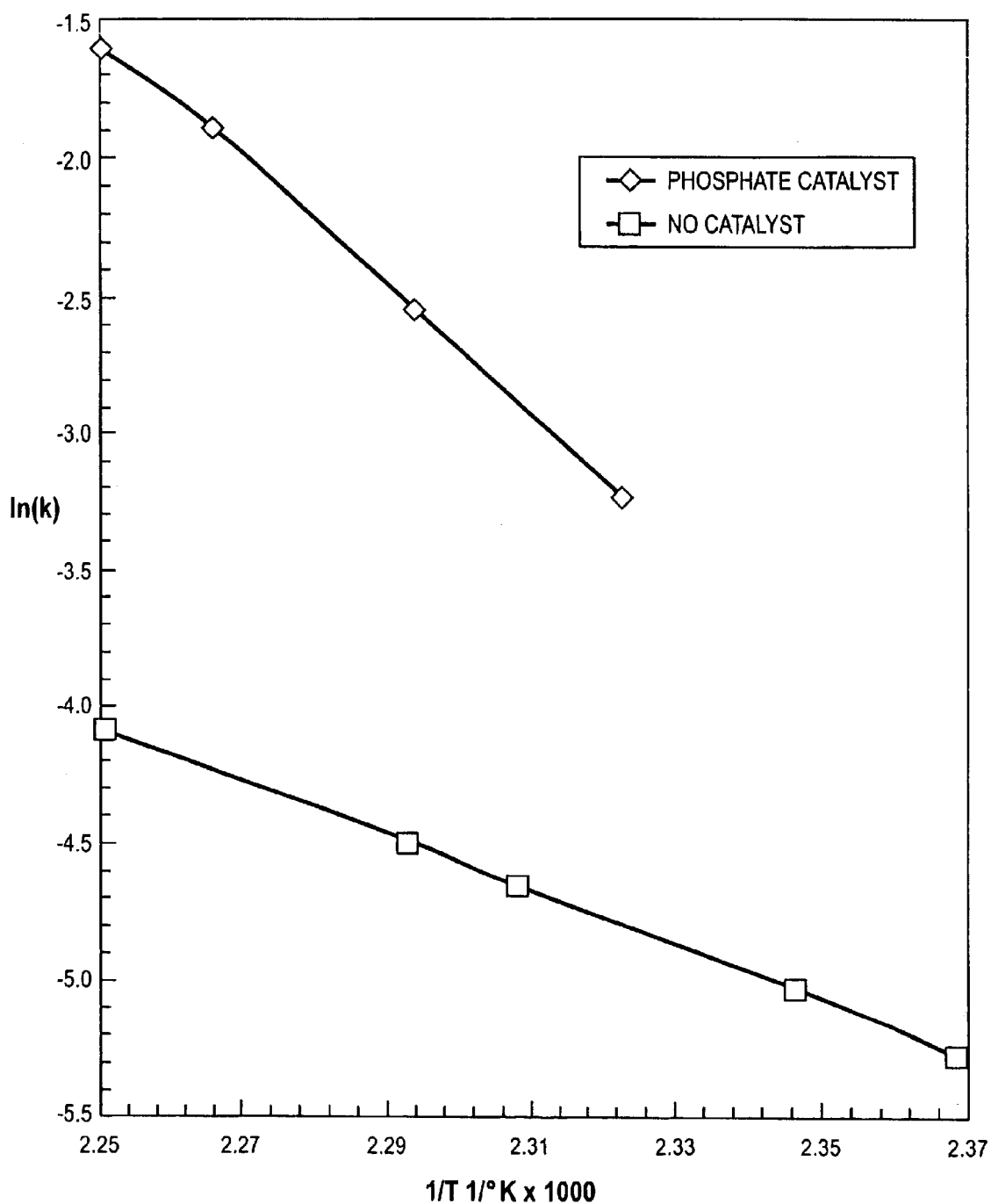
FIG. 3 depicts the data of FIG. 2 as the natural logarithm (ln) of reaction rate constant k versus inverse temperature (degrees Kelvin) to illustrate the substantially constant slope of a line fitted to the data.

* indicates extrapolated data; see FIGS. 2 and 3 and the discussion above.

These results can be compared with results from experiments using a MAP/DAP phosphate catalyst, which are tabulated below in Table 3 and plotted in FIG. 3.

TABLE 3

Catalyzed reaction Rate Constant vs. Temperature

| Temp (° C.) | Temp (° K) | 1/T | k (min-1) | 1/k (min) | ln(k) | MAP/DAP |
|---|---|---|---|---|---|---|
| **157.2 | 431 | 2.32E-03 | 0.039 | 25.64 | −3.24 | 0.17 |
| 163 | 436 | 2.29E-03 | 0.078 | 12.82 | −2.55 | 0.25 |
| 169 | 442 | 2.26E-03 | 0.15 | 6.667 | −1.90 | 0.32 |
| 171 | 444 | 2.25E-03 | 0.2 | 5.000 | −1.61 | 0.39 |

** indicates a single data point.

FIG. 3 provides a plot of ln(k) versus (1/T)×1000 using the data points from the non-catalyzed and catalyzed hydrolysis experiments tabulated above. The tabulated data at 171° C., for example, indicate that the phosphate catalyst reaction rate constant is approximately 12 times faster than the non-catalyzed reaction at this temperature. At 163° C., the catalyzed process is about seven times faster.

Example 4

It is possible to operate the urea hydrolysis process using a phosphate catalyst over a broad range of pressure. At low operating pressures (e.g., below about 20 psig) the liquid reaction mixture has a composition that is dramatically different. The reaction does not proceed significantly until the temperature is above about 145° C. At such temperatures and low pressure, water is driven out of the reaction mixture to such an extent that the reaction must be carried out at nearly the melting point of the catalyst mixture.

In an experiment that molten urea feed and the apparatus of Example 2, the MAP:DAP ratio in the equilibrium catalyst mixture was 1.134, and the composition of the reaction mixture was 51.94 wt. % MAP, 45.82 wt. % DAP, 1.2 wt. % urea and 1.09 wt. % water when the reactor was operated at 19 psig and 187° C. The flow rate of urea was 11.8 kg/hr. Saturated steam at about 200 psig was injected directly into the reactor through a flow control valve at a rate of 15.3 kg/hr.

The foregoing description is given for clearness of understanding only, and no unnecessary limitations should be understood therefrom, as modifications within the scope of the invention may be apparent to those having ordinary skill in the art.

What is claimed is:

1. A process for quantitatively converting urea to ammonia on demand, comprising the steps of:
   receiving a variable demand rate signal for ammonia;
   feeding reactants comprising urea and water into a reactor to provide a reaction mixture; and
   controlling temperature and pressure in the reactor to produce a gaseous product stream comprising ammonia and carbon dioxide at substantially constant concentrations despite variations in the demand rate signal.

2. The process of claim 1, wherein the controlling step comprises maintaining substantially constant temperature and substantially constant pressure.

3. The process of claim 2, further comprising the step of adding a catalyst into the reactor.

4. The process of claim 3, wherein the catalyst is an acid catalyst.

5. The process of claim 3, wherein the catalyst is selected from the group consisting of polyprotic acids, ammonium salts of polyprotic acids, and combinations thereof.

6. The process of claim 5, wherein the catalyst is selected from the group consisting of polyprotic mineral acids, ammonium salts of polyprotic mineral acids, and combinations thereof.

7. The process of claim 6, wherein the catalyst is selected from the group consisting of phosphoric acid, monoammonium dihydrogen phosphate, diammonium hydrogen phosphate, and combinations thereof.

8. The process of claim 6, wherein the feeding step comprises feeding urea and water in substantially constant proportion.

9. The process of claim 3, wherein the feeding step comprises feeding the reactants at a rate directly proportional to the demand rats.

10. The process of claim 3, further comprising the step of adding energy to the reaction mixture at a rate directly proportional to the demand rate.

11. The process of claim 9, wherein the feeding step comprises feeding aqueous urea into the reactor.

12. The process of claim 9, wherein the feeding step comprises feeding urea in the form of molten urea or solid urea into the reactor.

13. The process of claim 9, wherein the feeding step comprises feeding water in the form of steam into the reactor.

14. The process of claim 3, wherein the feeding step comprises feeding urea and water in constant proportion when the demand rate for ammonia is constant and changing the urea feed rate in an amount disproportionate to a change in the demand rate.

15. The process of claim 14, wherein the feeding step comprises feeding urea and water in constant proportion when the demand rate for ammonia is constant and increasing the urea feed rate in an amount disproportionate to an increase in the demand rate.

16. The process of claim 14, wherein the feeding step comprises feeding urea and water in constant proportion when the demand rate for ammonia is constant and decreasing the urea feed rate in an amount disproportionate to an decrease in the demand rate.

17. The process of claim 14, wherein the feeding step comprises feeding aqueous urea into the reactor.

18. The process of claim 14, wherein the feeding step comprises feeding urea an the form of molten urea or solid urea into the reactor.

19. The process of claim 14, wherein the feeding step comprises feeding water in the form of steam into the reactor.

20. The process of claim 3, wherein the feeding step comprises feeding at least 40 wt. % urea, based on the weight of the reactants fed into the reactor.

21. The process of claim 20, wherein the feeding step comprises feeding at least 50 wt. % urea, based on the weight of the reactants fed into the reactor.

22. The process of claim 3, wherein the controlling step comprises maintaining the pressure in the reactor below 20 psig.

23. The process of claim 22, wherein the controlling step comprises maintaining the reaction mixture temperature at least about 190° C.

24. The process of claim 22, wherein at least the surfaces of the reactor that contact the reactants comprise a corrosion-resistant material.

25. The process of claim 7, wherein the controlling step comprises maintaining the reaction mixture temperature in a range of about 155° C. to about 175° C.

26. The process of claim 7, wherein the controlling step comprises maintaining the pressure in the reactor in a range of about 80 psig to about 200 prig.

27. The process of claim 2, wherein the feeding step comprises feeding urea in the form of molten urea or solid urea into the reactor.

28. The process of claim 27, wherein the feeding step comprises feeding urea and water in constant proportion.

29. The process of claim 27, wherein the feeding step comprises feeding the reactants at a rate directly proportional to the demand rate.

30. The process of claim 27, farther comprising the step of adding energy to the reaction mixture at a rate directly proportional to the demand rate.

31. The process of claim 27, wherein the feeding step comprises feeding water in the form of steam into the reactor.

32. The process of claim 31, wherein the feeding step comprises feeding urea and water in constant proportion when the demand rate for ammonia is constant and changing the urea feed rate in an amount disproportionate to a change in the demand rate.

33. The process of claim 32, wherein the feeding step comprises feeding urea and water in constant proportion when the demand rate for ammonia is constant and increasing the urea feed rate in an amount disproportionate to an increase in the demand rate.

34. The process of claim 32, wherein the feeding step comprises feeding urea and water in constant proportion when the demand rate for ammonia is constant and decreasing the urea feed rate in an amount disproportionate to an decrease in the demand rate.

35. The process of claim 1, wherein the controlling atop comprises changing temperature or the reaction mixture in response to a change in the demand rate for ammonia and changing the pressure in the reactor in response to the temperature in the reactor.

36. The process of claim 35, wherein the feeding step comprises feeding urea and water in constant proportion.

37. The process of claim 36, wherein the feeding step comprises feeding the reactants to maintain a substantially constant volume of reaction mixture in the reactor.

38. The process of claim 37, wherein the feeding step comprises feeding the reactants in response to the level of reaction mixture in the reactor.

39. The process of claim 37, wherein the feeding step comprises feeding the reactants in response to the differential in mass flow rates between the reactants fed into the reactor and the gaseous product stream.

40. The process of claim 36, wherein the feeding step comprises feeding aqueous urea into the reactor.

41. The process of claim 36, wherein the feeding step comprises feeding urea in the form of molten urea or solid urea into the reactor.

42. The process of claim 36, wherein the feeding step comprises feeding water in the farm of steam into the reactor.

43. The process of claim 35, wherein the feeding step comprises feeding urea and water in constant proportion when the demand rate for ammonia is constant and changing the urea feed rate in an amount disproportionate to a change in the demand rate.

44. The process of claim 43, wherein the feeding step comprises feeding urea and water in constant proportion when the demand rate for ammonia is constant and increasing the urea feed rate in an amount disproportionate to an increase in the demand rate.

45. The process of claim 43, wherein the feeding step comprises feeding urea and water in constant proportion when the demand rate for ammonia is constant and decreasing the urea feed rate in an amount disproportionate to an decrease in the demand rate.

46. The process of claim 35, further comprising the stop of adding a catalyst to the reaction mixture.

47. The process of claim 1, comprising the step of agitating the reactants in the reactor.

48. The process of claim 47, wherein the agitating step comprises mechanically agitating the reactants.

49. The process of claim 47, wherein the agitating step comprises injecting steam into the reactor.

50. The process of claim 1, further comprising the step of adding a foam reducing agent to the reactants or the reaction mixture.

51. The process of claim 1, wherein the controlling step comprises maintaining the reaction mixture temperature at least about 150° C.

52. A process for quantitatively convening urea to ammonia on demand, comprising the steps of:
    feeding reactants comprising molten urea or solid urea and water into a reactor; and
    reacting the reactants in said reactor at elevated temperature and pressure to form a gaseous product stream comprising ammonia and carbon dioxide.

53. The process of claim 52, wherein the reactants feeding step comprises feeding water in the form of steam.

54. The process of claim 53, further comprising receiving a variable demand rate signal.

55. The process of claim 53, further comprising controlling the temperature in the reactor and the pressure in the reactor to produce a gaseous product stream comprising ammonia and carbon dioxide at substantially constant concentrations despite variations in the demand rare signal.

56. The process of claim 52, further comprising adding a catalyst into the reactor.

57. A process for quantitatively converting urea to ammonia on demand, comprising the steps of:
    receiving a variable demand rate signal for ammonia;
    feeding reactants comprising urea and water into a reactor at rates directly proportional to the demand rate to provide a reaction mixture;
    adding an acid catalyst into the reactor;
    maintaining the reaction mixture at a substantially constant temperature greater than about 150° C.; and
    maintaining substantially constant pressure greater than about 80 psig in the reactor;
    to produce a gaseous product stream comprising ammonia and carbon dioxide at substantially constant concentrations despite variations in the demand rate signal.

58. The process of claim 57, wherein the feeding step comprises feeding aqueous urea.

59. The process of claim 57, wherein the feeding step comprises feeding molten urea or solid urea.

60. The process of claim 57, wherein the feeding step comprises feeding water in the form of steam.

61. The process of claim 58, wherein the feeding step comprises feeding at least 50 wt. % urea, based on the weight of the reactants fed into the reactor.

62. A process for quantitatively converting urea to ammonia on demand, comprising the steps of:

receiving a variable demand rate signal for ammonia;

feeding reactants comprising urea and water into a reactor at rates directly proportional to the demand rats to provide a reaction mixture;

adding an acid catalyst into the reactor;

maintaining the reaction mixture at a substantially constant temperature at least about 190° C; and maintaining substantially constant pressure less than 20 psig in the reactor;

to produce a gaseous product stream comprising ammonia and carbon dioxide at substantially constant concentrations despite variations in the demand rate signal.

63. The process of claim 62, further comprising maintaining a pressure of at least about 10 psig in the reactor.

64. The process of claim 62, wherein the feeding step comprises feeding molten urea or solid urea.

65. The process of claim 62, wherein the feeding step comprises feeding water it the form of steam.

66. A process the quantitatively converting urea to ammonia on demand, comprising the steps of:

receiving a variable demand rate signal for ammonia;

feeding reactants comprising urea and water into a reactor at rates sufficient to provide a substantially constant volume of reaction mixture;

controlling the temperature in the reactor in response to a change in the demand rate for ammonia; and changing the pressure in the reactor in response to the temperature in the reactor;

to produce a gaseous product stream comprising ammonia and carbon dioxide at substantially constant concentrations despite variations in the demand raze signal.

67. The process of claim 66, wherein the feeding step comprises feeding molten urea or solid urea.

68. The process of claim 66, wherein the feeding step comprises feeding water in the form of steam.

* * * * *

UNITED STATES PATENT AND TRADEMARK OFFICE
CERTIFICATE OF CORRECTION

PATENT NO. : 6,761,868 B2
DATED : July 13, 2004
INVENTOR(S) : Brooks et al.

It is certified that error appears in the above-identified patent and that said Letters Patent is hereby corrected as shown below:

Column 36,
Line 17, delete "6" and insert -- 3 --.

Column 38,
Line 22, delete "rats" and insert -- rate --.
Line 51, delete "an" and insert -- in --.

Column 37,
Line 9, delete "prig" and insert -- psig --.
Line 18, delete "farther" and insert -- further --.
Line 39, delete "atop" and insert -- step --.
Line 40, delete "or" and insert -- of --.
Line 62, delete "farm" and insert -- form --.

Column 38,
Line 11, delete "stop" and insert -- step --.
Line 25, delete "convening" and insert -- converting --.

Column 39,
Line 3, delete "rats" and insert -- rate --.
Line 18, delete "it" and insert -- in --.

Column 40,
Line 13, delete "raze" and insert -- rate --.

Signed and Sealed this

First Day of February, 2005

JON W. DUDAS
*Director of the United States Patent and Trademark Office*

UNITED STATES PATENT AND TRADEMARK OFFICE
CERTIFICATE OF CORRECTION

PATENT NO. : 6,761,868 B2
DATED : July 13, 2004
INVENTOR(S) : Burton Brooks et al.

It is certified that error appears in the above-identified patent and that said Letters Patent is hereby corrected as shown below:

Column 17,
Lines 54 and 57, please delete "60" and insert -- 61 --.

Column 18,
Lines 20, 38 and 53, please delete "60" and insert -- 61 --.

Column 19,
Line 62, please delete "60" and insert -- 61 --.

Column 20,
Line 14, please delete "60" and insert -- 61 --.

Column 36,
Line 46, please delete "disproportionate to an" and insert -- disproportionate to a --.

Signed and Sealed this

Twenty-fourth Day of May, 2005

JON W. DUDAS
*Director of the United States Patent and Trademark Office*